US007788370B2

(12) United States Patent
Yugami

(10) Patent No.: US 7,788,370 B2
(45) Date of Patent: Aug. 31, 2010

(54) COMPUTER PRODUCT, REQUEST GROUPING APPARATUS, AND REQUEST GROUPING METHOD

(75) Inventor: Nobuhiro Yugami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 780 days.

(21) Appl. No.: 11/602,906

(22) Filed: Nov. 20, 2006

(65) Prior Publication Data
US 2007/0260589 A1 Nov. 8, 2007

(30) Foreign Application Priority Data
May 8, 2006 (JP) .............................. 2006-129385

(51) Int. Cl.
*G06F 15/173* (2006.01)
(52) U.S. Cl. ...................... 709/224; 709/223; 709/236; 714/39; 714/47
(58) Field of Classification Search ................ 709/203, 709/223–224, 230, 247; 370/252, 352
See application file for complete search history.

(56) References Cited

U.S. PATENT DOCUMENTS

| 6,226,673 | B1* | 5/2001 | Yoshimoto | 709/223 |
|---|---|---|---|---|
| 6,286,046 | B1* | 9/2001 | Bryant | 709/224 |
| 6,662,230 | B1* | 12/2003 | Eichstaedt et al. | 709/229 |
| 6,732,167 | B1* | 5/2004 | Swartz et al. | 709/223 |
| 7,146,002 | B1* | 12/2006 | Smith et al. | 379/265.13 |
| 7,231,496 | B2* | 6/2007 | Curtis | 711/137 |
| 7,290,056 | B1* | 10/2007 | McLaughlin, Jr. | 709/230 |
| 7,406,523 | B1* | 7/2008 | Kruy et al. | 709/227 |
| 7,454,457 | B1* | 11/2008 | Lowery et al. | 709/203 |
| 2002/0049730 | A1* | 4/2002 | Ishikawa et al. | 707/1 |
| 2003/0079041 | A1* | 4/2003 | Parrella et al. | 709/247 |
| 2004/0034744 | A1* | 2/2004 | Karlsson et al. | 711/133 |
| 2004/0127226 | A1* | 7/2004 | Dugad et al. | 455/450 |
| 2005/0289231 | A1* | 12/2005 | Harada et al. | 709/224 |
| 2006/0106921 | A1* | 5/2006 | Sim et al. | 709/223 |
| 2006/0106964 | A1* | 5/2006 | Clark et al. | 710/200 |

(Continued)

OTHER PUBLICATIONS

Demir et al. "Improving Transaction Server Performance under Heavy Loads with Differentiated Service and Active Network Interfaces." 2005 Fourth IEEE International Symposium on Network Computing and Applications (2005).*

(Continued)

*Primary Examiner*—Wing F Chan
*Assistant Examiner*—Michael Martinez
(74) *Attorney, Agent, or Firm*—Fujitsu Patent Center

(57) ABSTRACT

Request grouping rules are maintained for grouping a system request based on information relating to a character string in the system request; call relation sets are created from the system requests sent and received among the servers and stored in the request history by associating the system requests by call relation; the call relation sets are converted into inter-request group call relation sets based on the maintained request grouping rules; along with a frequency of appearance of the request group in the request history, inter-request group call relation patterns are derived for each request group, each inter-request group call relation pattern consisting of the request group invoking and the request group invoked by the request group in question; a rating value is calculated for rating the request groups based on the derived inter-request group call relation pattern.

13 Claims, 18 Drawing Sheets

U.S. PATENT DOCUMENTS

| | | | |
|---|---|---|---|
| 2006/0265416 A1* | 11/2006 | Seki et al. | 707/102 |
| 2007/0006177 A1* | 1/2007 | Aiber et al. | 717/136 |
| 2007/0041532 A1* | 2/2007 | Salonen et al. | 379/114.2 |
| 2007/0147347 A1* | 6/2007 | Ristock | 370/352 |
| 2007/0174428 A1* | 7/2007 | Lev Ran et al. | 709/218 |
| 2008/0059625 A1* | 3/2008 | Barnett et al. | 709/223 |
| 2008/0219176 A1* | 9/2008 | Yamada | 370/252 |

OTHER PUBLICATIONS

Wang et al. "Sharing Aggregate Computation of Multiple Group by Queries Over Distributed Data Stream." 2008 International Conference on Computer Science and Software Engineering (2008): 639-42.*

* cited by examiner

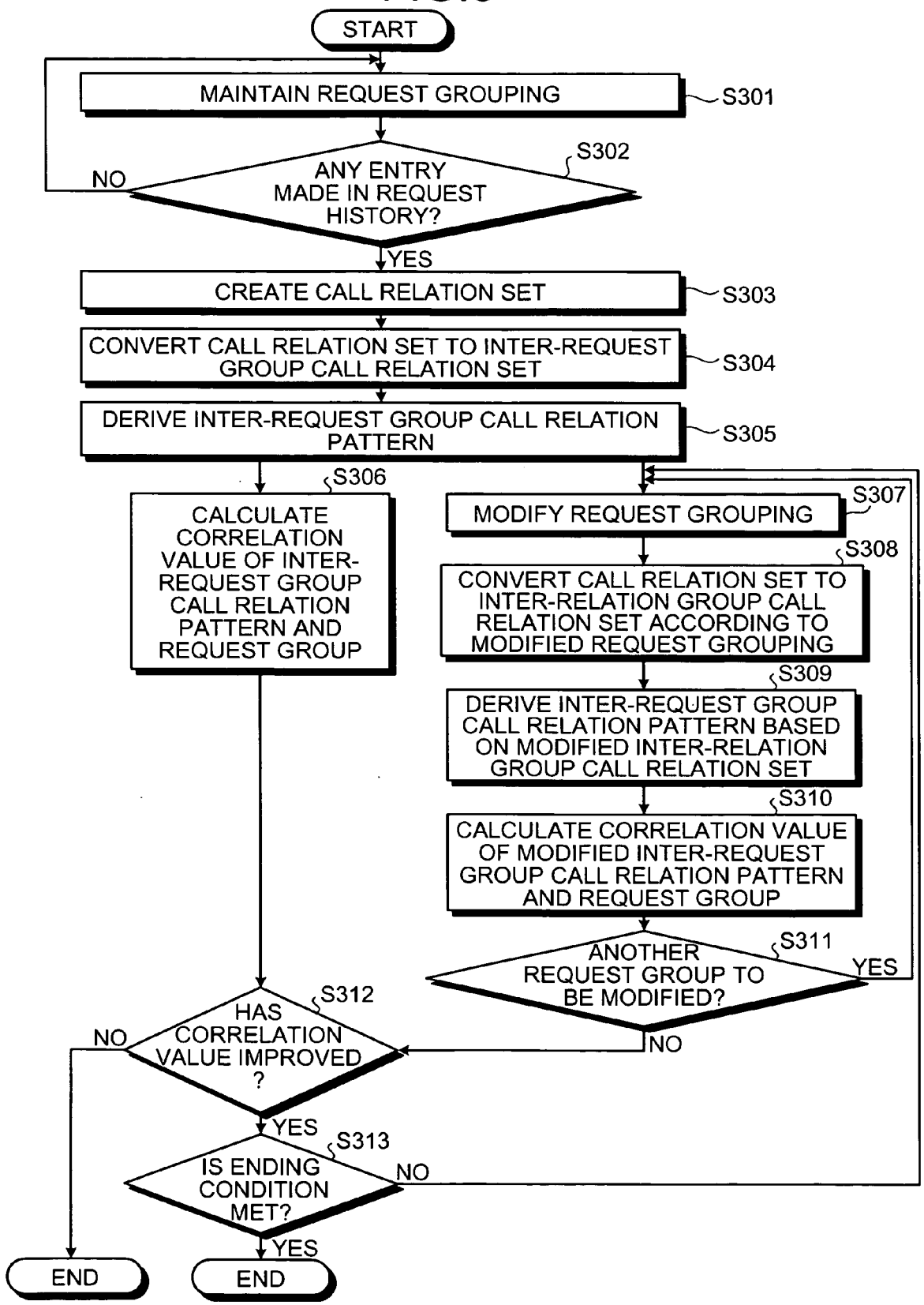

FIG.4

| ID | PROTOCOL | REQUEST NAME | CALL SOURCE IP | CALL DESTINATION IP | START TIME (SECONDS) | END TIME (SECONDS) | PROCESS DURATION (SECONDS) |
|---|---|---|---|---|---|---|---|
| 1 | HTTP | top/aaa.jsp?id=1&type=update | 999.999.999.999 | 100.100.100.8 | 0 | 10 | 10 |
| 2 | IIOP | sss/reqb | 100.100.100.8 | 100.100.100.9 | 1 | 2 | 1 |
| 3 | HTTP | top/bbb.jsp?id=2&type=update | 888.888.888.888 | 100.100.100.8 | 5 | 16 | 11 |
| 4 | IIOP | sss/reqa | 100.100.100.8 | 100.100.100.9 | 6 | 8 | 2 |
| 5 | HTTP | top/bbb.jsp?id=3&type=update | 777.777.777.777 | 100.100.100.8 | 9 | 20 | 11 |
| 6 | IIOP | sss/reqb | 100.100.100.8 | 100.100.100.9 | 12 | 17 | 5 |
| 7 | HTTP | top/bbb.jsp?id=3&type=create | 999.999.999.999 | 100.100.100.8 | 15 | 22 | 7 |
| 8 | IIOP | sss/reqc | 100.100.100.8 | 100.100.100.9 | 16 | 21 | 5 |
| 9 | HTTP | top/ddd.jsp?date=050928 | 888.888.888.888 | 100.100.100.8 | 19 | 23 | 4 |
| 10 | HTTP | top/aaa.jsp?id=4&type=update | 777.777.777.777 | 100.100.100.8 | 25 | 38 | 13 |
| 11 | IIOP | sss/reqb | 100.100.100.8 | 100.100.100.9 | 26 | 27 | 1 |
| 12 | HTTP | top/bbb.jsp?id=4&type=update | 999.999.999.999 | 100.100.100.8 | 35 | 45 | 10 |
| 13 | IIOP | sss/reqa | 100.100.100.8 | 100.100.100.9 | 37 | 39 | 2 |
| 14 | HTTP | top/bbb.jsp?id=5&type=update | 888.888.888.888 | 100.100.100.8 | 40 | 52 | 12 |
| 15 | HTTP | top/bbb.jsp?id=7&type=create | 777.777.777.777 | 100.100.100.8 | 43 | 57 | 14 |
| 16 | IIOP | seq/reqb | 100.100.100.8 | 100.100.100.9 | 45 | 49 | 4 |
| 17 | HTTP | top/ddd.jsp?date=050929 | 666.666.666.666 | 100.100.100.8 | 48 | 56 | 8 |
| 18 | IIOP | sss/reqc | 100.100.100.8 | 100.100.100.9 | 50 | 53 | 3 |

FIG.5

| ID | PROTOCOL | REQUEST NAME | PROCESS DURATION (SECONDS) | PARENT REQUEST CANDIDATE | CHILD REQUEST CANDIDATE |
|---|---|---|---|---|---|
| 1 | HTTP | top/aaa.jsp?id=1&type=update | 10 | {} | {2} |
| 2 | IIOP | sss/reqa | 1 | {1} | {} |
| 3 | HTTP | top/bbb.jsp?id=2&type=update | 11 | {} | {4} |
| 4 | IIOP | sss/reqa | 3 | {3} | {} |
| 5 | HTTP | top/bbb.jsp?id=3&type=update | 11 | {} | {6} |
| 6 | IIOP | sss/reqb | 5 | {5} | {} |
| 7 | HTTP | top/bbb.jsp?id=3&type=create | 7 | {} | {8} |
| 8 | IIOP | sss/reqc | 5 | {7} | {} |
| 9 | HTTP | top/ddd.jsp?date=050928 | 4 | {} | {} |
| 10 | HTTP | top/aaa.jsp?id=4&type=update | 13 | {} | {11} |
| 11 | IIOP | sss/reqb | 1 | {10} | {} |
| 12 | HTTP | top/bbb.jsp?id=4&type=update | 10 | {} | {13} |
| 13 | IIOP | sss/reqa | 2 | {12} | {} |
| 14 | HTTP | top/bbb.jsp?id=5&type=update | 12 | {} | {16} |
| 15 | HTTP | top/bbb.jsp?id=7&type=create | 14 | {} | {16,18} |
| 16 | IIOP | seq/reqb | 4 | {14,15} | {} |
| 17 | HTTP | top/ddd.jsp?date=050929 | 8 | {} | {18} |
| 18 | IIOP | sss/reqc | 3 | {15,17} | {} |

FIG.6

| TRANSACTION ID | PARENT REQUEST ID | CHILD REQUEST ID SET | PROBABILITY |
|---|---|---|---|
| 1 | 1 | {2} | 1.00 |
| 2 | 3 | {4} | 1.00 |
| 3 | 5 | {6} | 1.00 |
| 4 | 7 | {8} | 1.00 |
| 5 | 9 | {} | 1.00 |
| 6 | 10 | {11} | 1.00 |
| 7 | 12 | {13} | 1.00 |
| 8 | 14 | {} | 0.50 |
| 9 | 14 | {16} | 0.50 |
| 10 | 15 | {} | 0.25 |
| 11 | 15 | {16} | 0.25 |
| 12 | 15 | {18} | 0.25 |
| 13 | 15 | {16,18} | 0.25 |
| 14 | 17 | {} | 0.50 |
| 15 | 17 | {18} | 0.50 |

FIG.7

| REQUEST GROUP | CHARACTER STRING PATTERN | NUMBER OF APPEARANCE | CORRESPONDING REQUEST ID |
|---|---|---|---|
| G01 | top/aaa.jsp? | 2 | 1,10 |
| G02 | top/bbb.jsp? | 6 | 3,5,7,12,14,15 |
| G03 | top/ddd.jsp? | 2 | 9,17 |
| G11 | sss/reqa | 3 | 2,4,13 |
| G12 | ses/reqb | 3 | 6,11,16 |
| G13 | ttt/reqc | 2 | 8,18 |

FIG.8

| TRANSACTION ID | PARENT REQUEST ID | (SET OF) CHILD REQUEST ID | PARENT REQUEST GROUP | (SET OF) CHILD REQUEST GROUP | PROBABILITY |
|---|---|---|---|---|---|
| 1 | 1 | {2} | G01 | {G11} | 1.00 |
| 2 | 3 | {4} | G02 | {G11} | 1.00 |
| 3 | 5 | {6} | G02 | {G12} | 1.00 |
| 4 | 7 | {8} | G02 | {G13} | 1.00 |
| 5 | 9 | {} | G03 | {} | 1.00 |
| 6 | 10 | {11} | G01 | {G12} | 1.00 |
| 7 | 12 | {13} | G02 | {G11} | 1.00 |
| 8 | 14 | {} | G02 | {} | 0.50 |
| 9 | 14 | {16} | G02 | {G12} | 0.50 |
| 10 | 15 | {} | G02 | {} | 0.25 |
| 11 | 15 | {16} | G02 | {G12} | 0.25 |
| 12 | 15 | {18} | G02 | {G13} | 0.25 |
| 13 | 15 | {16,18} | G02 | {G12,G13} | 0.25 |
| 14 | 17 | {} | G03 | {} | 0.50 |
| 15 | 17 | {18} | G03 | {G13} | 0.50 |

FIG.9

| PROTOCOL | REQUEST GROUP IN QUESTION | NUMBER OF APPEARANCE OF REQUEST GROUP | PATTERN ID | PARENT REQUEST GROUP | SET OF CHILD REQUEST GROUP | SET OF SIBLING REQUEST GROUP | CORRESPONDING TRANSACTION | EXPECTED FREQUENCY OF APPEARANCE |
|---|---|---|---|---|---|---|---|---|
| HTTP | G01 | 2 | P011 | NONE | {G11} | {} | 1 | 1 |
| | | | P012 | NONE | {G12} | {} | 6 | 1 |
| | G02 | 6 | P021 | NONE | {} | {} | 8, 10 | 0.75 |
| | | | P022 | NONE | {G11} | {} | 2, 7 | 2 |
| | | | P023 | NONE | {G12} | {} | 3, 9, 11 | 1.75 |
| | | | P024 | NONE | {G13} | {} | 4, 12 | 1.25 |
| | | | P025 | NONE | {G12, G13} | {} | 13 | 0.25 |
| | G03 | 2 | P031 | NONE | {} | {} | 5, 14 | 1.5 |
| | | | P032 | NONE | {G13} | {} | 15 | 0.5 |
| IIOP | G11 | 3 | P111 | G01 | {} | {} | 1 | 1 |
| | | | P112 | G02 | {} | {} | 2, 7 | 2 |
| | G12 | 3 | P121 | G01 | {} | {} | 6 | 1 |
| | | | P122 | G02 | {} | {} | 3, 9, 11 | 1.75 |
| | | | P123 | G02 | {} | {G13} | 13 | 0.25 |
| | G13 | 2 | P131 | G02 | {} | {} | 4, 12 | 1.25 |
| | | | P132 | G02 | {} | {G12} | 13 | 0.25 |
| | | | P133 | G03 | {} | {} | 15 | 0.5 |

FIG.10

| REQUEST GROUP \ PARENT-CHILD PATTERN | P011,P022 | P012,P023 | P021,P031 | P024,P032 | P025 | TOTAL |
|---|---|---|---|---|---|---|
| G01 | 1 | 1 | 0 | 0 | 0 | 2 |
| G02 | 2 | 1.75 | 0.75 | 1.25 | 0.25 | 6 |
| G03 | 0 | 0 | 1.5 | 0.5 | 0 | 2 |
| TOTAL | 3 | 2.75 | 2.25 | 1.75 | 0.25 | 10 |

FIG.11

| PARENT-CHILD PATTERN / REQUEST GROUP | P111,P121 | P112,P122, P131 | P123 | P132 | P133 | TOTAL |
|---|---|---|---|---|---|---|
| G11 | 1 | 2 | 0 | 0 | 0 | 3 |
| G12 | 1 | 1.75 | 0.25 | 0 | 0 | 3 |
| G13 | 0 | 1.25 | 0 | 0.25 | 0.5 | 2 |
| TOTAL | 2 | 5 | 0.25 | 0.25 | 0.5 | 8 |

FIG.12

| PROTOCOL | REQUEST GROUP IN QUESTION | NUMBER OF APPEARANCE OF REQUEST GROUP | PATTERN ID | PARENT REQUEST GROUP | SET OF CHILD REQUEST GROUP | SET OF SIBLING REQUEST GROUP | CORRESPONDING TRANSACTION | EXPECTED FREQUENCY OF APPEARANCE |
|---|---|---|---|---|---|---|---|---|
| HTTP | G02 | 2 | P021 | NONE | ⌀ | ⌀ | 10 | 0.25 |
| | | | P022 | NONE | {G12} | ⌀ | 11 | 0.25 |
| | | | P023 | NONE | {G13} | ⌀ | 4, 12 | 1.25 |
| | | | P024 | NONE | {G12, G13} | ⌀ | 13 | 0.25 |
| | G03 | 2 | P031 | NONE | ⌀ | ⌀ | 5, 14 | 1.5 |
| | | | P032 | NONE | {G13} | ⌀ | 15 | 0.5 |
| | G04 | 6 | P041 | NONE | {G11} | ⌀ | 1,2,7 | 3 |
| | | | P042 | NONE | {G12} | ⌀ | 3,6,9 | 2.5 |
| | | | P043 | NONE | ⌀ | ⌀ | 8 | 0.5 |
| IIOP | G11 | 3 | P111 | G04 | ⌀ | ⌀ | 1,2,7 | 3 |
| | G12 | 3 | P121 | G04 | ⌀ | ⌀ | 3,6,9 | 2.5 |
| | | | P122 | G02 | ⌀ | ⌀ | 11 | 0.25 |
| | | | P123 | G02 | ⌀ | {G13} | 13 | 0.25 |
| | G13 | 2 | P131 | G02 | ⌀ | ⌀ | 4, 12 | 1.25 |
| | | | P132 | G02 | ⌀ | {G12} | 13 | 0.25 |
| | | | P133 | G03 | ⌀ | ⌀ | 15 | 0.5 |

FIG.13

| PROTOCOL | REQUEST GROUP IN QUESTION | NUMBER OF APPEARANCE OF REQUEST GROUP | PATTERN ID | PARENT REQUEST GROUP | SET OF CHILD REQUEST GROUP | SET OF SIBLING REQUEST GROUP | CORRESPONDING TRANSACTION | EXPECTED FREQUENCY OF APPEARANCE |
|---|---|---|---|---|---|---|---|---|
| HTTP | G02 | 2 | P021 | NONE | {} | {} | 10 | 0.25 |
| | | | P022 | NONE | {G14} | {} | 11 | 0.25 |
| | | | P023 | NONE | {G13} | {} | 4, 12 | 1.25 |
| | | | P024 | NONE | {G14, G13} | {} | 13 | 0.25 |
| | G03 | 2 | P031 | NONE | {} | {} | 5, 14 | 1.5 |
| | | | P032 | NONE | {G13} | {} | 15 | 0.5 |
| | G04 | 6 | P041 | NONE | {G14} | {} | 1,2,3,6,7,9 | 5.5 |
| | | | P042 | NONE | {} | {} | 8 | 0.5 |
| IIOP | G14 | 6 | P141 | G04 | {} | {} | 1,2,3,6,7,9 | 5.5 |
| | | | P142 | G02 | {} | {} | 11 | 0.25 |
| | | | P143 | G02 | {} | {G13} | 13 | 0.25 |
| | G13 | 2 | P131 | G02 | {} | {} | 4, 12 | 1.25 |
| | | | P132 | G02 | {} | {G14} | 13 | 0.25 |
| | | | P133 | G03 | {} | {} | 15 | 0.5 |

FIG.14

| PARENT-CHILD PATTERN / REQUEST GROUP | P021, P031, P042 | P022, P041 | P023, P032 | P024 | TOTAL |
|---|---|---|---|---|---|
| G02 | 0.25 | 0.25 | 1.25 | 0.25 | 2 |
| G03 | 1.5 | 0 | 0.5 | 0 | 2 |
| G04 | 0.5 | 5.5 | 0 | 0 | 6 |
| TOTAL | 2.25 | 5.75 | 1.75 | 0.25 | 10 |

FIG.15

| REQUEST GROUP \ PARENT-CHILD PATTERN | P141 | P142,P131 | P143 | P132 | P133 | TOTAL |
|---|---|---|---|---|---|---|
| G14 | 5.5 | 0.25 | 0.25 | 0 | 0 | 6 |
| G13 | 0 | 1.25 | 0 | 0.25 | 0.5 | 2 |
| TOTAL | 5.5 | 1.50 | 0.25 | 0.25 | 0.5 | 8 |

FIG.16

| PROTOCOL | REQUEST GROUP | CHARACTER STRING PATTERN | CORRESPONDING REQUEST ID |
|---|---|---|---|
| HTTP | G02 | ¬top/*.jsp?id=*&type=update ∧ top/bbb.jsp?* | 7, 15 |
|  | G03 | ¬top/*.jsp?id=*&type=update ∧ top/ccc.jsp?* | 9, 17 |
|  | G04 | top/*.jsp?id=*&type=update | 1, 3, 5, 10, 12, 14 |
| IIOP | G13 | ttt/reqc | 8, 18 |
|  | G14 | sss/req* | 2, 4, 6, 11, 13, 16 |

FIG.17

| TRANSACTION ID | PARENT REQUEST ID | CHILD REQUEST ID SET | PROBABILITY |
|---|---|---|---|
| 1 | 1 | {2} | 1.00 |
| 2 | 3 | {4} | 1.00 |
| 3 | 5 | {6} | 1.00 |
| 4 | 7 | {8} | 1.00 |
| 5 | 9 | {} | 1.00 |
| 6 | 10 | {11} | 1.00 |
| 7 | 12 | {13} | 1.00 |
| 8 | 14 | {16} | 1.00 |
| 9 | 15 | {18} | 1.00 |
| 10 | 17 | {} | 1.00 |

COMPUTER PRODUCT, REQUEST GROUPING APPARATUS, AND REQUEST GROUPING METHOD

BACKGROUND OF THE INVENTION

1. Field of the Invention

The present invention relates to a technology for grouping requests.

2. Description of the Related Art

There are conventional system architectures, such as three-level Web systems, that process a request from a user by invoking requests among a plurality of servers in a coordinated manner. The request refers to a set of data such as protocols used by individual processes, request name, IP address, and time. For example, in system consisting of a client (Web browser), a Web server, an application server, and a database server, a request from the client is received by the Web server. The request received by the Web server causes a new request to the application server, which then accesses the database server specified in the request and executes the process in the database server. Thus, the request from the client is processed by invoking requests among the plurality of servers in a coordinated manner.

To analyze the efficiency of such systems or the causes of failure in such systems, there are analysis methods available that involve model-based analysis of the processes in the plurality of servers in response to the request from the user. Specifically, the efficiency or the causes of failure in such systems can be analyzed by evaluating the difference between the processes that take place in the actual server and in the model in response to the requests and a tendency of change of the system load.

Creating models for analysis purpose necessitates that transactions be segregated into groups, a transaction being a series of processes in response to requests being invoked among the plurality of servers. The requests first need to be segregated into groups as a premise to transaction grouping. In a transaction grouping method disclosed in Japanese Patent Laid-Open Publication No. 2006-11683, the requests are grouped directly based on the request name sent from the client to the Web server.

However, the conventional grouping technology based on the request name tends to generate too many groups. For example, it is usually good to collect requests for static web pages because they are processed by the system with very similar way, namely, they require very short response time and don't cause any other request to the application or database servers. However, the grouping with the request name segregates such requests to many different groups. Segregating into too many groups decreases the number of requests in each group and degrades the statistical reliability of the analysis.

SUMMARY OF THE INVENTION

It is an object of the present invention to at least partially solve the problems in the conventional technology.

According to an aspect of the present invention, a request grouping apparatus that groups system requests in a system that processes a request from a client by sending and receiving the system requests among a plurality of servers in the system in a coordinated manner, includes a request grouping maintaining unit that maintains request grouping rules for grouping a system request based on information relating to a character string in the system request; an inter-request group call relation pattern deriving unit that creates call relation sets from the system requests sent and received among the servers and stored in the request history by associating the requests by call relation, converts the call relation sets between the request themselves into inter-request group call relation sets based on the request grouping maintained by the request grouping maintaining unit, and derives, along with a frequency of appearance of the request group in the request history, inter-request group call relation patterns for each request group, each inter-request group call relation pattern consisting of the request group invoking and the request group invoked by the request group in question; and a rating value calculating unit that calculates a rating value whereby the request groups are rated based on the inter-request group call relation pattern derived by the inter-request group call relation pattern deriving unit.

According to another aspect of the present invention, a request grouping method for grouping system requests in a system that processes a request from a client by sending and receiving the system requests among a plurality of servers in the system in a coordinated manner, includes maintaining request grouping rules for grouping a system request based on information relating to a character string in the system request; creating call relation sets from the system requests sent and received among the servers and stored in the request history by associating the system requests by call relation; converting the call relation sets into inter-request group call relation sets based on the request grouping rules maintained at the maintaining; deriving, along with a frequency of appearance of the request group in the request history, inter-request group call relation patterns for each request group, each inter-request group call relation pattern consisting of the request group invoking and the request group invoked by the request group in question; and calculating a rating value for rating the request groups based on the inter-request group call relation pattern derived at the deriving.

According to still another aspect of the present invention, a computer-readable recording medium stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a flowchart of a process procedure performed by the request grouping apparatus shown in FIG. 2;

FIG. 4 is a schematic for explaining a request history;

FIG. 5 is a schematic for explaining call relation between requests;

FIG. 6 is a schematic for explaining a call relation set;

FIG. 7 is a schematic for explaining request grouping;

FIG. 8 is a schematic for explaining an inter-request group call relation set;

FIG. 9 is a schematic for explaining an inter-request group call relation pattern;

FIG. 10 is a schematic for explaining correlation value calculation;

FIG. 11 is a schematic for explaining correlation value calculation;

FIG. 12 is a schematic for explaining the inter-request group call relation pattern after modification of the request grouping;

FIG. 13 is a schematic for explaining the inter-request group call relation pattern after modification of the request grouping;

FIG. 14 is a schematic for explaining the correlation value calculation after modification of the request grouping;

FIG. 15 is a schematic for explaining the correlation value calculation after modification of the request grouping;

FIG. 16 is a schematic for explaining the request grouping after modification;

FIG. 17 is a schematic for explaining a call relation set according to a third embodiment of the present invention.

DETAILED DESCRIPTION OF THE PREFERRED EMBODIMENTS

Exemplary embodiments of the present invention are described below with reference to the accompanying drawings. The important terms used in the embodiments are explained first, followed by an overview and the salient feature of a first embodiment of the present invention, structure and process flow of the request grouping apparatus, a request grouping process of the request grouping apparatus in detail, effects due to the first embodiment, and finally, other embodiments.

The terms used in the embodiments that follow are explained first. In the following description, the term "request" (corresponding to "system request" in the claims) denotes data being sent and received among a plurality of servers forming a system architecture, such as a three-level Web system, that processes a request by a user in a coordinated manner. Specifically, the term "request" refers to a set of data such as protocols used by individual processes, request name, IP addresses, and time. The request establishes a call relation (corresponding to "call relation" in the claims), causing the plurality of servers in the system to work in a coordinated manner. For instance, to process a Hyper Text Transfer Protocol (HTTP) request, an Internet Inter-ORB (Object Request Broker) Protocol (IIOP) request may require to be invoked.

The requests are normally registered as request history in a log of each server. The request history is used for analyzing the performance or cause of failure of the system. For the purpose of analysis, it is necessary to group requests into transactions, each transaction being a series of processes being executed based on the requests. In other words, a transaction is a set of requests that includes the request made from outside the system, child requests that are invoked to process the request from the outside the system, and other child requests that are invoked within the system either directly or indirectly to process the above child requests. Generating transactions relates requests at a certain server to other requests at other servers and makes it clear the relations between behaviors of different servers. As a result, it is possible to analyze the system efficiency and causes of the system troubles.

As a premise of generating transactions from the requests in the request history, request grouping (corresponding to "request grouping" in the claims) is first carried out which involves segregating the requests into groups by a certain method. Because grouping requests reduces the number of request types based on the behaviors in the system, it becomes possible to analyze the call relationship between request types (inter-request group call relation) statistically.

Figure 1:
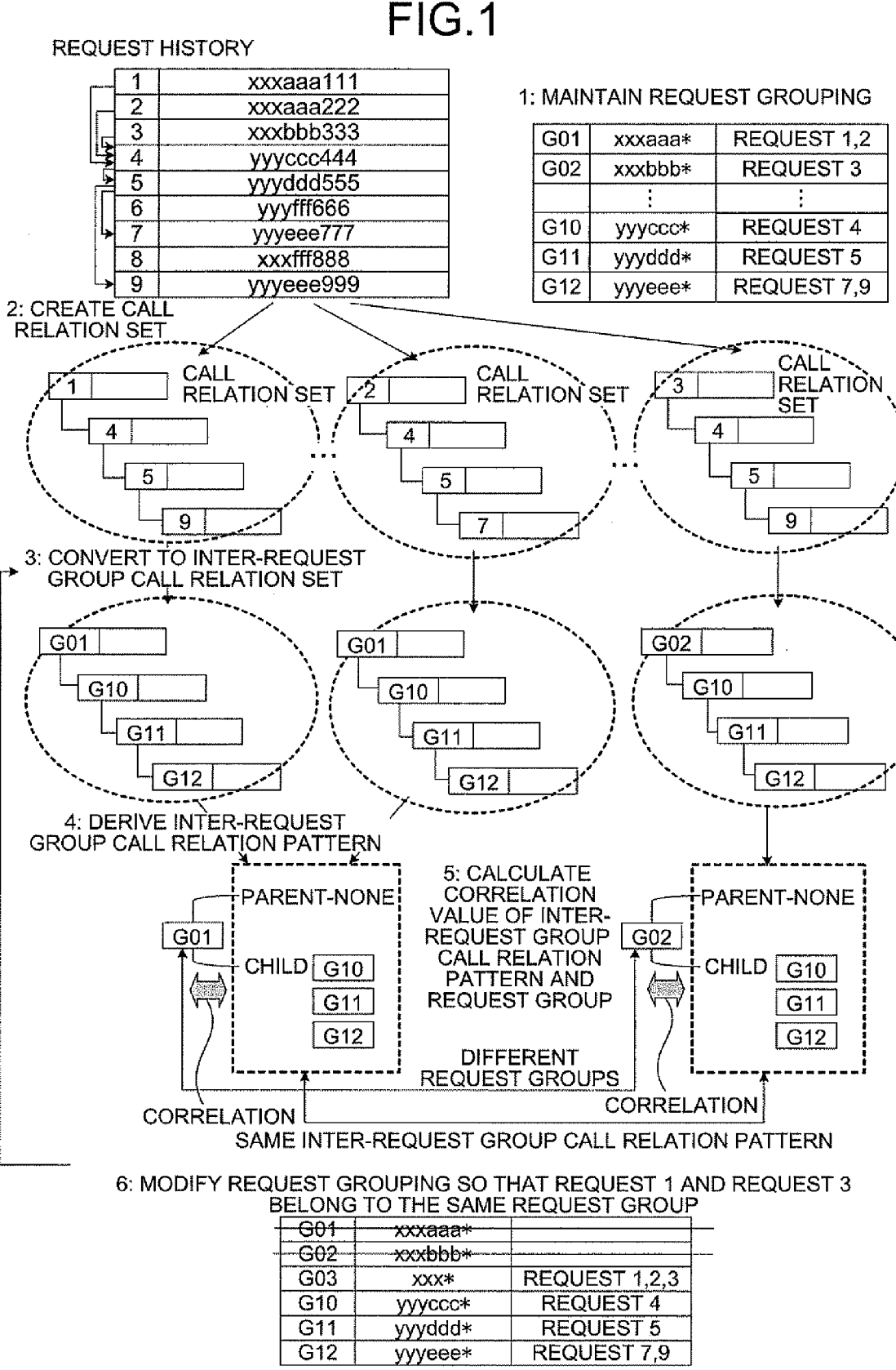
FIG. 1 is a schematic for explaining an overview and salient features of a request grouping apparatus according to a first embodiment of the present invention.

FIG. 1 is a schematic for explaining an overview and salient features of the request grouping apparatus according to the first embodiment.

The essence of the request grouping apparatus according to the first embodiment is that the request grouping apparatus groups the requests in a system that processes a request from a client by invoking requests among a plurality of servers in a coordinated manner. The salient feature of the request grouping apparatus according to the first embodiment lies in the fact that the request grouping apparatus can derive an appropriate request grouping so as to enable the transactions to be satisfactorily grouped, unlike the conventional method of request grouping in which the request name is directly used for grouping the requests.

The request grouping apparatus already has stored therein the request history containing the requests sent and received among the plurality of servers. The request grouping apparatus also maintains therein request grouping in which a request group is assigned for a character string generated by predetermined rules such as "Ignore all cgi parameters in request names for html protocol" (see (1) of FIG. 1). To explain the request grouping with reference to FIG. 1, Request 1 bears the request name xxxaaa111, and Request 2 bears the request name xxxaaa222. In the request grouping, a request bearing a character string xxxaaa*, where * is a wildcard character denoting any character(s), is assigned as belonging to Request Group G01. Thus, as both Request 1 and Request 2 have the character string "xxxaaa" in their request names, both are assigned as belonging to Request Group G01.

The request grouping apparatus according to the first embodiment first creates a call relation set by combining requests that call or are called by each other (see (2) of FIG. 1). For example, the request grouping apparatus creates the call relation sets shown in FIG. 1, namely, a first set that includes Request 1 which invokes Request 4, which in turn invokes Request 5, and which in turn invokes Request 9, a second set that includes Request 2 which invokes Request 4, which in turn invokes Request 5, and which in turn invokes Request 7, and a third set that includes Request 3 which invokes Request 4, which in turn invokes Request 5, and which in turn invokes Request 9. The request grouping apparatus according to the first embodiment creates all of possible call relations that satisfy preset conditions such as "a parent request that invokes a child request must start earlier than the child request and must finish later than the child request", based on a preset specification, for all the requests sent and received among the plurality of servers and stored in the request history, each call relation set including therein requests associated with one another by the projected call relation. However, only a few call relation sets are shown in FIG. 1.

The request grouping apparatus then converts the created call relation set into an inter-request group call relation set based on the request grouping (see (3) of FIG. 1). For example, Request 1 is grouped as belonging to Request Group G01 in the request grouping shown in (1) of FIG. 1, and is thus converted to G01. Similarly, Request 4 is grouped as belonging to Request Group G10, and is thus converted to G10. Similarly, Request 5 and Request 9 are converted to Request Groups G11 and G12, respectively. Similar conversion takes place in other call relation sets as well.

The request grouping apparatus then derives, along with the frequency of appearance of the request group in the request history, inter-request group call relation patterns for each request group from the converted inter-request group call relation sets. Each inter-request group call relation pattern consists of a target request group, a request group that invokes the target request group and child request groups invoked by the target request group (see (4) of FIG. 1). An inter-request group call relation pattern may have no parent request when the target request group represents the requests that are called from the outside of the system. It may have no child request and may have plural child requests. For example, for Request Group G01 in the inter-request group call relation set consisting of Request Groups G01, G10, G11, and G12, the request grouping apparatus will derive the inter-request group call relation pattern in which there will be no parent request group shown for Request Group G01 as there is no parent request invoking Request Group 01, and Request Groups G10, G11, and G12 will be shown as child request groups invoked by Request Group G01.

Similarly, for Request Group 02 of the inter-request group call relation set consisting of Request Groups G02, G10, G11, and G12 shown in (3) of FIG. 1, the request grouping apparatus will derive the inter-request group call relation pattern in which again there will be no parent request group shown for Request Group G02 as there is no parent request invoking Request Group 10, and Request Groups G10, G11, and G12 will be shown as child request groups invoked by Request Group G02, thus deriving an inter-request group call relation pattern similar to the one of the inter-request group call relation set consisting of Request Groups G0, G10, G11, and G12. The request grouping apparatus derives one or more inter-request call relation patterns for each request group. Then, the request grouping apparatus counts the frequency of each pattern and calculates the strength of the correlation between request groups and patterns. The request grouping apparatus uses the strength as the evaluation of the current request grouping. The correlation becomes stronger when behaviors of the requests in a certain request group are similar with each other and are different with the requests belonging to other request groups. Then, the stronger correlation means the current grouping is better to analyze the behavior of the system.

The request grouping apparatus then tries to improve the request grouping by assigning new request groups (see (6) of FIG. 1). For example, in the example presented above, the inter-request group call relation pattern derived for the inter-request group call relation set consisting of Request Groups G01, G10, G11, and G12 and that for the inter-request group call relation set consisting of Request Groups G02, G10, G11, and G12 is identical. In other words, though Request 3 is processed by the same inter-request group call relation pattern as Request 1 and Request 2, it is grouped under a different request group.

To correct the drawback of the current request grouping, the request grouping apparatus according to the first embodiment modifies the character string data in the request grouping by employing a method of modifying the request grouping so that all the requests processed by a particular inter-request group call relation pattern belong to one request group. For example, Request 1 and Request 2 belonging to Request Group G01, and Request 3 belonging to Request Group G02 are processed by an identical inter-request group call relation patterns. Therefore, the request grouping apparatus modifies the request grouping so that Request 3 belongs to the same request group as Request 1 or Request 2. To give a specific example, the request grouping apparatus modifies the request grouping by modifying the character string data to xxx* and assigns a new request group, namely Request Group 03 to the modified character string. Thus, the request grouping apparatus ensures that Request 1, Request 2, and Request 3 belong to the same request group, namely Request Group G03.

The request grouping apparatus according to the first embodiment then replaces the old request groups with the modified request groups (see (3) of FIG. 1), and derives the inter-request group call relation pattern for all the modified request groups (see (4) of FIG. 1). The request grouping apparatus then calculates, based on the frequency of appearance of the request group, the correlation value whereby the strength of correlation between the derived inter-request group call relation pattern and the modified request group is rated (see (5) of FIG. 1).

The request grouping apparatus repeatedly modifies the request, grouping until a predetermined ending condition is met. The request grouping apparatus recognizes that the ending condition is met by comparing with the calculated correlation value. As the request grouping of the request grouping apparatus a high correlation value rating at the time when the request grouping apparatus according to the first embodiment ends request grouping, the transactions can be satisfactorily grouped based on the requests grouped by the request grouping.

Thus, the request grouping apparatus according to the first embodiment groups the requests in the system that processes a request from a client by invoking requests among plural servers in a coordinated manner. Unlike the conventional method of request grouping in which the request name is directly used for grouping the requests, the request grouping apparatus assigns a request group for a predetermined character string data in the request name and rates the assigned request group, modifying the request grouping so as to obtain a high correlation value rating. Consequently, an appropriate request grouping can be derived so as to enable the transactions to be satisfactorily grouped.

Figure 2:
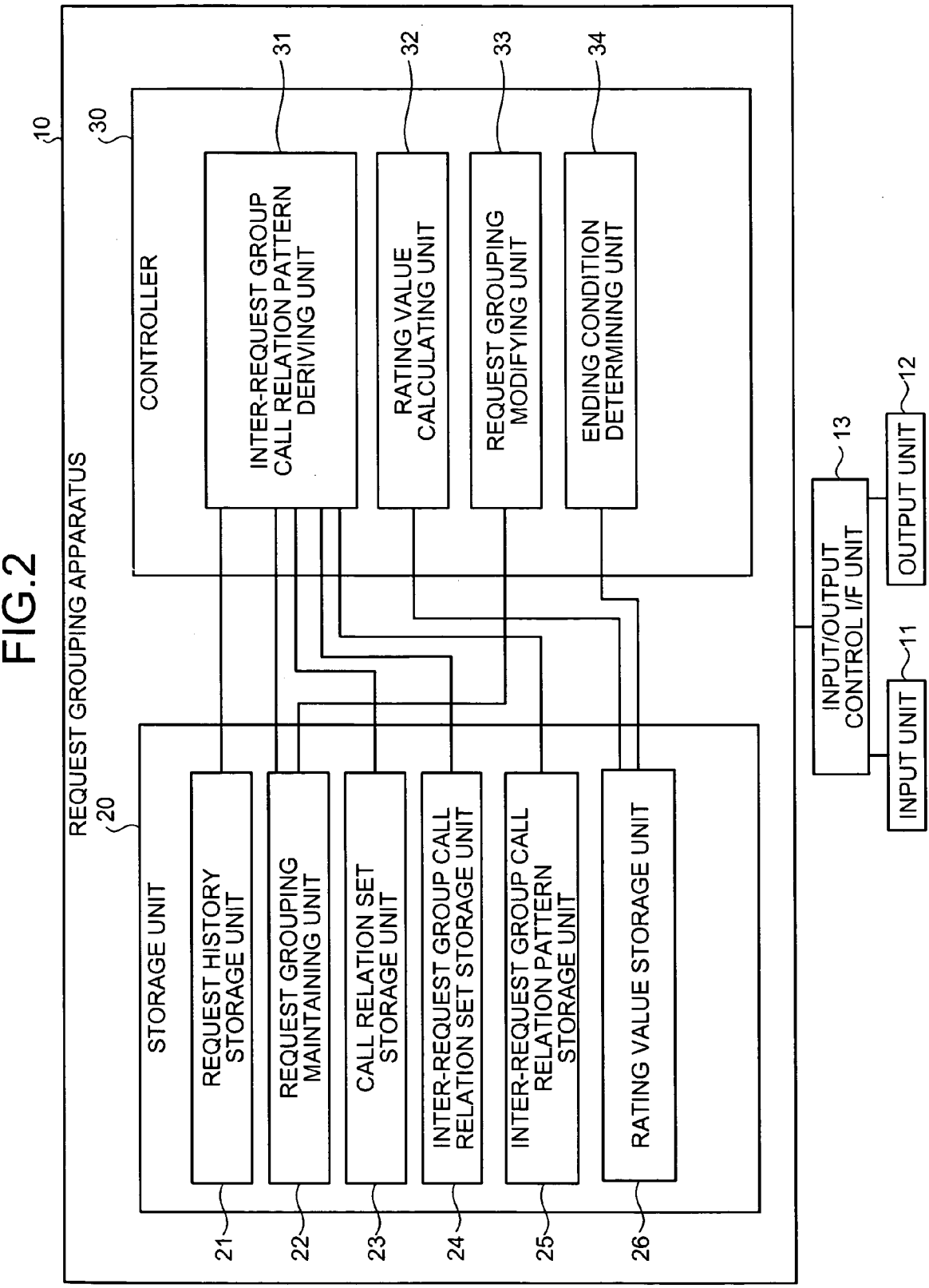
FIG. 2 is a block diagram of the request grouping apparatus according to the first embodiment.

FIG. 2 is a block diagram of a request grouping apparatus 10 according to the first embodiment of the present invention.

The request grouping apparatus 10 includes an input unit 11, an output unit 12, an input-output (I/O) control interface (I/F) unit 13, a storage unit 20, and a controller 30.

The input unit 11 accepts input of data required for the processes performed by the controller 30, instructions for launching the processes, etc. via a key board, storage media, communication media, and the like. For example, the input unit 11 accepts input of data pertaining to the request being sent and received among the plurality of servers, or a predetermined character string in the request name, a command for calculating the rating value of a request group, or for modifying the request grouping, etc. The request accepted by the input unit 11 is stored in a request history storage unit 21. The character string accepted by the input unit 11 is maintained in a request grouping maintaining unit 22.

The output unit 12 outputs the results of various processes performed by the controller 30 or instructions required for launching the processes on a monitor, or printer. For example, the output unit 12 outputs the request history accepted by the input unit 11, or the request grouping maintained in the request grouping maintaining unit 22, or the rating value calculated by a rating value calculating unit 32.

The I/O control I/F unit 13 controls the data transfer between the input unit 11 and the output 12 as well as the storage unit 20 and the controller 30.

The storage unit 20 stores data required for the various processes performed by the controller 30, and in close relevance to the present invention, includes the request history storage unit 21, the request grouping maintaining unit 22, a call relation set storage unit 23, an inter-request group call relation set storage unit 24, an inter-request group call relation pattern storage unit 25, and a rating value storage unit 26. The request grouping maintaining unit 22 corresponds to "request grouping maintaining unit" in the claims.

The request history storage unit 21 stores the requests sent and received among the plurality of servers and that need to be segregated into groups by the request grouping apparatus 10. FIG. 4 is a drawing of an example of the request history input by the input unit 11 and stored in the request history storage unit 21.

The request grouping maintaining unit 22 maintains the request grouping in which request groups are assigned in the request grouping apparatus 10. FIG. 7 is a drawing of an example of the request grouping input by the input unit 11 or modified by a request grouping modifying unit 33 and maintained in the request grouping maintaining unit 22.

The call relation set storage unit 23 storages the call relation set created during the process of derivation of the inter-request group call relation pattern by the request grouping apparatus 10. FIG. 6 is a drawing of an example of the call relation set created during the process of derivation of the inter-request group call relation pattern by an inter-request group call relation pattern deriving unit 31.

The inter-request group call relation set storage unit 24 stores the inter-request group call relation set created during the process of derivation of the inter-request group call relation pattern by the request grouping apparatus 10. FIG. 8 is a drawing of an example of the inter-request group call relation set consisting of the call relation set created during the process of derivation of the inter-request group call relation pattern by the inter-request group call relation pattern deriving unit 31, and the inter-request group call relation set obtained by converting the call relation set with the corresponding request group assigned in the request grouping maintained in the request grouping maintaining unit 22.

The inter-request group call relation pattern storage unit 25 stores the inter-request group call relation patterns derived by the request grouping apparatus 10. FIG. 9 is a drawing of an example the inter-request group call relation set derived by the inter-request group call relation pattern deriving unit 31 by converting the call relation set. The inter-request group call relation pattern storage unit 25 stores, for each request group, the derived inter-request group call relation patterns, each of which includes therein the request group(s) invoking and the request group(s) invoked by the request group in question, along with the frequency of appearance of the request group in the request history.

The rating value storage unit 26 stores the rating value calculated for the request groups by the request grouping apparatus 10. Specifically, the rating value storage unit 26 stores the correlation value whereby the strength of correlation between the inter-request group call relation patterns and the request groups, calculated by the rating value calculating unit 32, is rated.

The controller 30 controls the request grouping apparatus 10 and performs various processes. In close relevance to the present invention, the controller 30 includes the inter-request group call relation pattern deriving unit 31, the rating value calculating unit 32, the request grouping modifying unit 33, and an ending condition determining unit 34. The inter-request group call relation pattern deriving unit 31 corresponds to "inter-request group call relation pattern deriving unit" in the claims. The rating value calculating unit 32 corresponds to "rating value calculating unit" in the claims. The request grouping modifying unit 33 corresponds to "request grouping modifying unit" in the claims. The ending condition determining unit 34 corresponds to "ending condition determining unit" in the claims.

The inter-request group call relation pattern deriving unit 31 creates the call relation sets from the request history that contains requests that are sent and received among the plurality of servers. The requests in the call relation sets are associated with one another by call relation. The inter-request group call relation pattern deriving unit 31 then converts each call relation set into the inter-request group call relation set based on the request grouping. The inter-request group call relation pattern deriving unit 31 then derives, along with the frequency of appearance of the request group, the inter-request group call relation patterns for each request group, each pattern consisting of the request group(s) invoking and the request group(s) invoked by the request group in question.

Specifically, the inter-request group call relation pattern deriving unit 31 creates for the requests in the request history stored in the request history storage unit 21, the call relation sets, each call relation set consisting of requests associated with one another by call relation, and stores the call relation sets in the call relation set storage unit 23. The inter-request group call relation pattern deriving unit 31 then converts the call relation set stored in the call relation set storage unit 23 into the inter-request group call relation set based on the request grouping maintained in the request grouping maintaining unit 22, and stores inter-request group call relation set in the inter-request group call relation set storage unit 24. The inter-request group call relation pattern deriving unit 31 then derives the inter-request group call relation pattern for each request group in the inter-request group call relation set, each of which includes therein the request group(s) invoking and the request group(s) invoked by the request group in question, along with the frequency of appearance of the request group in the request history, and stores the inter-request group call relation pattern in the inter-request group call relation pattern storage unit 25. The process of the inter-request group call relation pattern deriving unit is described in detail in a later section.

The rating value calculating unit 32 calculates the correlation value whereby the strength of correlation between the inter-request group call relation pattern and the request group is rated based on the frequency of appearance in the request history. Specifically, the rating value calculating unit 32 calculates, based on the frequency of appearance derived along with the inter-request group call relation pattern, the correlation value of the inter-request group call relation pattern stored in the inter-request group call relation pattern storage unit 25 and the request group maintained in the request grouping maintaining unit 22, and stores the calculated correlation value in the rating value storage unit 26. The process of the rating value calculating unit 32 is described in detail in a later section.

The request grouping modifying unit 33 modifies the predetermined character string data in the request names in the request grouping and assigns a new request group to the modified character string. Specifically, the request grouping modifying unit 33 modifies the predetermined character string maintained in the request grouping maintaining unit 22, assigns a new request group to the modified character string, and maintains modified request grouping in the request grouping maintaining unit 22. The process of the request grouping modifying unit is described in detail in a later section.

The ending condition determining unit 34 determines whether the ending condition is met by comparing the rating value calculated after the inter-request group call relation pattern is derived for each modified request group with the predetermined ending condition. Specifically, the ending condition determining unit 34 determines whether the ending condition is met by comparing the rating value calculated by the rating value calculating unit 32 after the inter-request group call relation pattern is derived for each modified request group by the inter-request group call relation pattern deriving unit 31 with the predetermined ending condition. The process of the ending condition determining unit 34 is described in detail in a later section.

FIG. 3 is a flowchart of the process procedure performed by the request grouping apparatus shown in FIG. 2.

The request grouping apparatus 10 maintains in the request grouping maintaining unit 22 the request grouping (see FIG. 7) in which a request group is assigned to a predetermined character string (step S301).

The request grouping apparatus 10 then determines whether there has been any entry made in the request history stored in the request history storage unit 21 (step S302). If it is determined that an entry has been made (Yes at step S302), the request grouping apparatus 10 creates call relation sets (see FIG. 6), each of which including therein requests associated with one another by call relation and stores the call relation sets in the call relation set storage unit 23 (step S303). If it is determined that no entry has been made in the call history (No at step S302), the request grouping apparatus 10 awaits entry.

The request grouping apparatus 10 then coverts the call relation set stored in the call relation set storage unit 23 into the inter-request group call relation set (see FIG. 8) based on the request grouping maintained in the request grouping maintaining unit 22, and stores the inter-request group call relation set in the inter-request group call relation set storage unit 24 (step S304).

The request grouping apparatus 10 then derives, for every request group in the inter-request group call relation set stored in the inter-request group call relation set storage unit 24, the inter-request group call relation patterns (see FIG. 9), each of which includes therein the request group(s) invoking and the request group(s) invoked by the request group in question, along with the frequency of appearance of the request group in the request history, and stores the derived inter-request group call relation pattern together with the frequency of appearance in the inter-request group call relation pattern storage unit 25 (step S305).

The request grouping apparatus 10 then calculates, based on the frequency of appearance, the correlation value whereby the strength of correlation between the inter-request group call relation pattern stored in the inter-request group call relation pattern storage unit 25 and the request group maintained in the request grouping maintaining unit 22 is rated, and stores the correlation value in the rating value storage unit 26 (step S306).

In addition, the request grouping apparatus 10 modifies the predetermined character string in the request name in the request grouping, and maintains the modified request grouping in the request grouping maintaining unit 22 (step S307).

The request grouping apparatus 10 then converts the call relation sets stored in the call relation set storage unit 23 again into the inter-request group call relation sets based on the modified request grouping maintained in the request grouping maintaining unit 22, and stores the newly converted inter-request group call relation sets in the inter-request group call relation set storage unit 24 (step S308).

Next, the request grouping apparatus 10 derives, for all the modified request groups in the newly converted inter-request group call relation sets stored in the inter-request group call relation set storage unit 24, the inter-request group call relation patterns, each of which includes therein the request group (s) invoking and the request group(s) invoked by the modified request group, along with the frequency of appearance of the request group in the request history, and stores the derived inter-request group call relation patterns in the inter-request group call relation pattern storage unit 25 (step S309).

The request grouping apparatus 10 then calculates, based on the frequency of appearance, the correlation value whereby the strength of correlation between the modified inter-request group call relation patterns stored in the inter-request group call relation pattern storage unit 25 and the modified request groups is rated, and stores the correlation value in the rating value storage unit 26 (step S310).

The request grouping apparatus 10 next determines whether any request group needs to be modified (step S311). If there are request groups requiring modification (Yes at step S311), the request grouping apparatus 10 returns to step S307 and repeats the subsequent steps. If modification of request grouping is not required (No at step S311), the request grouping apparatus 10 compares the correlation value calculated at step S306 and the correlation calculated at step S310 to check whether an improved correlation value is obtained after modifying the request grouping (step S312).

If an improved correlation value is obtained (Yes at step S312), the request grouping apparatus 10 compares another ending condition to determine whether the ending condition is met (step S313). If the ending condition is not met (No at step S313), the request grouping apparatus 10 returns to step S307 and modifies the request grouping. If improved correlation value is not obtained (No at step S312) or if the ending condition is not met (No at step S313), the request grouping apparatus 10 ends the request grouping process.

The request grouping process of the request grouping apparatus according to the first embodiment is described below with reference to FIG. 4 to FIG. 16. FIG. 4 is a schematic for explaining the request history. FIG. 5 is a schematic for explaining call relation between requests. FIG. 6 is a schematic for explaining the call relation set. FIG. 7 is a schematic for explaining the request grouping. FIG. 8 is schematic for explaining the inter-request group call relation set. FIG. 9 is a schematic for explaining the inter-request group call relation pattern. FIG. 10 and FIG. 11 are schematics for explaining correlation value calculation. FIG. 12 and FIG. 13 are schematics for explaining the inter-request group call relation pattern after modification of request grouping. FIG. 14 and FIG. 15 are schematics for explaining correlation value calculation after modification of request grouping. FIG. 16 is a schematic for explaining the request grouping after modification.

Premise for Request Grouping Process in First Embodiment

Web systems generally are three-level systems consisting of Web servers, application servers, and database servers. However, for the sake of convenience, the request grouping process of the request grouping apparatus 10 according to the first embodiment is supposed as being implemented on a two-level system that includes a Web server (having an Internet Protocol (IP) address of 100.100.100.8) and an application server (having an IP address of 100.100.100.9). Further, it is supposed that communication between the client and the Web server takes place by Hyper Text Transfer Protocol (HTTP) and communication between the Web server and the application server takes place by Internet Inter-Object Request Broker (ORB) Protocol (IIOP).

The request grouping apparatus according to the first embodiment exhaustively projects call relation, based on a preset specification, for all the requests sent and received among the plurality of servers and stored in the request history. The request history, as shown in FIG. 4, includes data pertaining to each request, such as request ID, protocol, request name, call source IP address, call destination IP address, request time (start time), response time (end time), and process duration.

The call source IP address is the IP address of the computer that sends the request. The call destination IP address is the IP address of the computer that receives the request or that actually processes the request. For example, in the system architecture of the Web system that processes requests from users by sending and receiving requests among the plurality of servers in a coordinated manner, in an HTTP-based communication, the call source IP address indicates the computer (client) of the user that is using the Web browser and the call destination IP address indicates the Web server belonging to the Web system.

The request name is a character string that denotes the nature of the request. The request name can be edited to include a character string denoting the nature of response to the request denoted by the character string indicating the nature of the request made by the source computer. The process time is calculated by subtracting the start time from the end time.

The request history can also be obtained by using the logs (such as access logs of the Web server) stored in each server, capturing communication between computers and analyzing its content (see Japanese Patent Laid-Open Publication No. 2006-11683).

Projecting Call Relation Between Requests

The request grouping apparatus 10 according to the first embodiment exhaustively projects call relation according to a preset specification for all the requests in the request history shown in FIG. 4. Call relation between requests refers to the relation established when, for example, an IIOP request is invoked to process an HTTP request.

The call relation projection in the first embodiment is performed for all the requests in the request history according to a preset specification of a combination of a call source IP address, a call destination IP address, the start time, and the end time. For example, for establishing a call relation in a case where Request Q is invoked for processing Request R, one of the specifications that must be satisfied is that the call source IP address of Request Q must be the IP address of the computer processing Request R. In other words, the call source IP address of Request Q must be the call destination IP address of Request R. Further, another specification that must be satisfied is that the start time of Request Q must be later than the start time of Request R and the end time of Request Q must be before the end time of Request R.

A specific example of projection of call relation using the specifications mentioned above is described by taking the example of the request having the ID 15 (hereinafter, "Request 15") in the request history shown in FIG. 4. As the call destination IP address of Request 15 is 100.100.100.8, for processing Request 15, the request that can potentially be invoked by Request 15 must have the call source IP address 100.100.100.8. The requests having the ID 2, 4, 6, 8, 11, 13, 16, and 18 satisfy this specification. The request grouping apparatus 10 according to the first embodiment then selects those requests from among the requests satisfying the first specification whose start time is after the start time of Request 15 and whose end time is before the end time of Request 15. Thus, Request 16 and Request 18 are selected based on this specification. In other words, Request 16 and Request 18 can potentially be invoked by Request 15.

In the first embodiment, the invoking request is called a parent request and the invoked request is called a child request. Thus, Request 15 is the parent request for Request 16 and Request 18, and conversely, Request 16 and Request 18 are child requests of Request 15. The call relation projected in this manner only indicates the probability that Request 16 may potentially be invoked for processing Request 15 or that Request 18 may potentially be invoked for processing Request 15. Request 16 and Request 18 may potentially be invoked for processing other requests (such as Request 14) as well.

The request grouping apparatus 10 according to the first embodiment similarly projects call relation for all the requests in the request history shown in FIG. 4, and groups together parent request(s) and child request(s) for each request.

Creating Call Relation Set

The request grouping apparatus 10 according to the first embodiment then creates the call relation sets, shown in FIG. 6, in which request are associated with one another by the projected call relation. The call relation set is referred to as a transaction (or a transaction candidate) in the first embodiment. In other words, a transaction is a set of requests that includes the request made from outside the system, a child request that is invoked to process the request from the outside the system, and another child request that is invoked within the system either directly or indirectly to process the earlier child request, grouped together with the call relation between the requests preserved.

If the call relation between requests are projected accurately, the transaction, which is a set of requests interconnected by call relation, created by the request grouping apparatus 10 will also be accurate. However, the call relation projected by the request grouping apparatus 10 is only a probability. Consequently, the request grouping apparatus 10 according to the first embodiment calculates the probably for each transaction.

For creating a transaction candidate, the request grouping apparatus 10 according to the first embodiment needs to separate the requests that are invoked from outside the system and the requests that are invoked from within the system. In the two-level system of the first embodiment that consists of the Web server and the application server, the requests forwarded from the client to the Web server using HTTP are considered as requests being invoked from outside the system, and the requests forwarded from the Web server to the application server using IIOP are considered as requests being invoked from within the system. It is supposed here that the requests forwarded using IIOP are not directly invoked from outside the system.

The request grouping apparatus 10 selects one request invoked from outside the system, and adds to it another that can potentially be invoked by the first request, then adds another request that can potentially be invoked by the previous request, and so on, until all the requests that can potentially be invoked have been added, thereby creating a transaction candidate. In other words, the request grouping apparatus 10 selects one request invoked from outside the system, either does not select any child request candidate for the selected request or selects one or more child request candidates and adds to the previously selected request, again either does not select any child request candidate for the previously added request or selects one or more child request candidates and adds to the previously added request, and so on, until all potential child request candidates have been subjected to the process.

For example, let us suppose that the request grouping apparatus 10 selects Request 1 as the request invoked from outside the system. As shown in FIG. 5, there is only one child request candidate for Request 1, namely Request 2. The request grouping apparatus 10 may either select or not select the child request candidate Request 2. As the protocol used by Request 2 is IIOP, according to the presupposition made in the first embodiment, the request invoking Request 2 from within the system has to be any of the requests using HTTP as the protocol. According to FIG. 5, the only potential parent request candidate that could call Request 2 is Request. Therefore, the request grouping apparatus 10 can surmise that the request that has invoked Request 2 is none other than Request 1, thus assigning a probability of "1" to the call relation between Request 1 and Request 2. Therefore, the option of selecting the child request candidate becomes valid for this particular example.

According to FIG. 5, the child request candidate for Request 2, selected and added to Request 1, is a null set, indicating that Request 2 itself has no child request candidate. Consequently, the request grouping apparatus 10 ends the transaction candidate creation process. Thus, the created transaction candidate consists of Request 1 and Request 2, with the call relation between them being Request 1 invoking Request 2 and the probability being one.

Let us suppose that the request grouping apparatus 10 selects Request 15 as the request invoked from outside the system. According to FIG. 5, the child request candidates of Request 15 are Request 16 and Request 18. The request grouping apparatus 10 in this case has four options, namely, neither select Request 16 nor Request 18, select only Request 16, select only Request 18, and select both Request 16 and Request 18. As the protocol used by both Request 16 and Request 18 is IIOP, according to the presupposition made in the first embodiment, the request invoking Request 16 and Request 18 from within the system has to be any of the requests using HTTP as the protocol. According to FIG. 5, the potential parent request candidates that can invoke Request 16 are Request 14 and Request 15, and the potential parent request candidates that can invoke Request 18 are Request 15 and Request 17. Therefore, the probability of Request 16 and Request 18 being invoked by Request 15 is 0.5. Thus, the probability of each of the four options mentioned above is 0.25.

According to FIG. 5, the child request candidate for Request 16 and Request 18 is a null set, indicating that neither Request 16 nor Request 18 has any child request candidate. Consequently, the request grouping apparatus 10 ends the transaction candidate creation process.

FIG. 6 is a schematic for explaining the transaction candidates created by the request grouping apparatus 10 according to the first embodiment for all the requests in the request history shown in FIG. 4 that are invoked from outside the system. As the system in the first embodiment is presumed to be a two-level system consisting of a Web server and an application server, the transaction candidates are represented as a set consisting of one HTTP request invoked from outside the system, and the IIOP request(s) invoked by the HTTP request. Therefore, in FIG. 6, the HTTP requests are listed as parent requests and the IIOP requests are listed as child requests.

Maintaining Request Grouping

The request grouping maintained by the request grouping apparatus 10 according to the first embodiment is explained below. The request grouping assigns a request group according to a predetermined character string in the request name. In the present invention, rather than assigning a group to a set of requests whose processes are similar, request group assignation is meaningful, and assigned based on a specific character string pattern, or a logical product or a logical sum of the character string, so that the user can easily understand the result of the analysis performed based on the request grouping.

The condition set down for request group assignment in the first embodiment is that the parameter portion of the HTTP request name (all characters after ?), should be ignored, and that the IIOP request name should be used as it is. For example, in the HTTP request Request 1, as the request name is "top/aaa.jsp?id=1&type=update", a request group is assigned for "top/aaa.jsp?*" in which the parameter portion "id=1&type=update" is not included. FIG. 7 is a schematic for explaining the request grouping. As shown in FIG. 7, three types of HTTP request groups and three types of IIOP request groups are assigned. Deriving inter-request group call relation pattern The request grouping apparatus 10 according to the first embodiment then converts the created call relation sets into inter-request group call relation sets based on the request grouping maintained by it. By this conversion, the request grouping apparatus 10 derives the inter-request group call relation patterns for each request group, each pattern consisting of the request group(s) invoking and the request group(s) invoked by the request group in question, along with the frequency of appearance of the request group. The inter-request group call relation pattern shall hereinafter be called parent-child pattern. A parent-child pattern is a combination of the parent request group invoking the concerned request group, sibling request group(s) invoked by the same parent request group, and the child request directly invoked by the concerned request group.

To explain derivation of the parent-child pattern in detail, for example, if we look for an IIOP Request Group G13 among the transaction candidates indicated as request groups in FIG. 8, the transaction candidates that include Request Group G13 are Transaction 4, Transaction 12, Transaction 13, and Transaction 15. Among these transactions, in Transaction 4 and Transaction 12, the invoking request group is an HTTP Request Group G02 and hence there are no sibling request groups. Thus, the parent-child pattern created for Request Group 13 in Transaction 4 and Transaction 12 will have Request Group G02 as the parent request group, a null set as the child request group, and a null set as the sibling request group. The probability of frequency of appearance of Request Group G13 in Transaction 4 and Transaction 12 will be 1.25, obtained by adding 1 and 0.25, which are the probability of frequency of appearance of Request Group G13 in Transaction 4 and Transaction 12, respectively.

The parent-child pattern created for Request Group G13 in Transaction 13 will have Request Group G02 as the parent request group, a null set as the child request group, and {G12} as the sibling request group. The probability of frequency of appearance of Request Group G13 in Transaction 13 will be 0.25. Similarly, the parent-child pattern created for Request Group G13 in Transaction 15 will have Request Group G03 as the parent request group, a null set as the child request group, and a null set as the sibling request group. The probability of frequency of appearance of Request Group G13 in Transaction 15 will be 0.5.

FIG. 9 is a drawing of a table showing a result of determination of the parent-child pattern for all the request groups along with the frequency of appearance (expected value) of the request groups. As a two-level system consisting of a Web server and an application server is presented as an example in the first embodiment, in the parent-child pattern for all HTTP requests there are no parent request groups and a null set is returned for sibling request group, and in the parent-child pattern for all IIOP requests, a null set is returned for child request group.

Calculating Correlation Value

After deriving the parent-child patterns for all the request groups, the request grouping apparatus 10 according to the first embodiment calculates, based on the derived parent-child patterns, the rating value whereby the request groups are rated. It is preferable when analyzing the behavior or performance of a system that similar behavior and performance are represented by the same request group and differing behavior and performance are represented by different request groups. Therefore, as the most basic element of the behavior of the system, the first embodiment focuses on the inter-group call relation represented by the parent-child pattern. In other words, a request group preferably should not have more than one parent-child pattern (or, even if there are more than one parent-child patterns, only one of them should have high concentration of frequency of appearance), and all identical particular parent-child patterns should be in the same request group (or, even if they are found in different request groups, the concentration of frequency of appearance should be low).

Therefore, the request grouping apparatus according to the first embodiment calculates the correlation value for rating the strength of correlation between the request group and the parent-child pattern. The request grouping apparatus 10 according to the first embodiments gives a better rating to the request group with a higher the correlation value. There are several methods for rating the strength of correlation that are based on the criteria of data volume. However, the request grouping apparatus 10 according to the first embodiment uses the qui-square method, and calculates the strength of correlation by determining, for all the possible combinations of all the request groups and the parent-child patterns, the square of the difference between the actual frequency of appearance of the request group in a particular parent-child pattern and expected frequency of appearance of the request group in the parent-child pattern in the case where they are independent of each other, and adding the values. In this rating method, a rating value of 0 is assigned when the request group and the parent-child pattern are completely independent of each other, and the strength of correlation increases as the value increases. As the parent-child patterns differ for request groups using different protocols, the qui-square method is applied protocol-wise, and normalization of the value is carried out request-wise based on the result (by dividing by the number of requests using the protocol), and the resulting values are added to obtain the rating value.

The rating carried out by the request grouping apparatus 10 according to the first embodiment is explained in detail. In the table shown in FIG. 9 where parent-child patterns for each request group are grouped together, the point to be noted in the context of correlation value calculation is that the same parent-child pattern appears in different request groups. For example, both the parent-child patterns Pattern P011 and Pattern 022 have no parent request group, have {G11} as the child request group, and a null set as the sibling request group. These two patterns are considered the same pattern from the point of view of calculation of the strength of correlation.

FIG. 10 and FIG. 11 are drawings of tables showing the result of correlation value calculation performed request group-wise, based on the criteria for identifying as same pattern described above.

The request grouping apparatus 10 according to the first embodiment first calculates the rating value for the HTTP requests. The frequency of appearance of HTTP requests is 10, the frequency of appearance of Request Group G01 is 2, and frequency of appearance of the parent-child pattern Pattern P011 (=P022) is 3. The expected value of the frequency of appearance when the Request Group G01 is processed by the parent-child pattern P011 (=P022) is 0.6 (2×3/10=0.6). As the actual frequency of appearance is 1, the square of the difference between the actual value and the expected value is 0.16 ((1−0.6)^2−0.16). The request grouping apparatus 10 calculates this value for all the request groups and parent-child patterns and adds the resulting values, which adds up to 2.94. The request grouping apparatus 10 then divides 2.94 by the number of HTTP requests, that is 10, which yields a rating value of 0.294.

The request grouping apparatus 10 performs similar calculations for the IIOP requests and obtains a rating value of 0.088. The request grouping apparatus 10 obtains the rating value for the request groups at this stage by adding the rating value obtained for the HTTP requests and the rating value obtained for the IIOP requests, that is, 0.382 (0.294+0.088=0.382).

Modifying Request Grouping

The request grouping apparatus 10 according to the first embodiment modifies the data pertaining to the predetermined character string in the request name of the request in the request grouping and modifies the request grouping by assigning a new request group. It is preferable that only one parent-child pattern exists for one request group (or, even if there are several parent-child patterns, only one of them has a high concentration of frequency of appearance), and that all identical parent-child patterns are in the same group (or, even if they are in different groups, their concentration of frequency of appearance is low). To achieve this, there are two possible methods of request grouping modification.

The first method of request grouping modification is a method by which requests that are processed by the same parent-child pattern but belonging to different request groups are reassigned a new request group so that they belong to the same request group. The second method of request grouping modification is a method by which requests that are processed by different parent-child patterns but belonging to the same group are put in different request groups. In the first embodiment employs the former method, that is, the method by which requests that are processed by the same parent-child pattern but belonging to different request groups are reassigned a new request group so that they belong to the same request group.

The method of request grouping modification is explained below by citing an example. As shown in FIG. 10, the requests processed by the parent-child pattern Pattern 011 (=022) belong to Request Group 01 as well as Request Group 02. It can be learnt from FIG. 9 that the request belonging to G01 and processed by the parent-child pattern Pattern 011 (=022) is the HTTP request Request 1 that belongs to Transaction 1, and the requests belonging to G02 and processed by the parent-child pattern Pattern 011 (=022) are Request 3 and Request 12 that belong to Transaction 2 and Transaction 7, respectively. Thus, Request 1 and Request 3, or Request 1 and Request 12 belong to different groups in spite of being processed by the same parent-child pattern. Therefore, the request grouping apparatus 10 modifies the request grouping for each of the request combinations.

Specifically, the request grouping apparatus 10 determines a character string pattern S that is common in the request names of the two selected requests, and creates a new request group associated with the character string pattern S. To select the request group in which the intended request should belong out of the two request groups, namely, the original request group and the new request group, an appropriate priority order is set for the request group. The various other criteria for selection are the request group with the least number of requests, the request group having a long corresponding character string pattern (in other words, the request group having a more strict condition), etc. However, in the request grouping apparatus 10 according to the first embodiment, the most recent request group is selected. The logic behind this selection criterion is that the new request group is an introduction to improve the shortcomings in the old request group and hence should be preferred over any old request group.

None of the requests in Request Group G01, Request Group G02, and Request Group G03, which are the existing HTTP request groups in the request grouping apparatus 10 according to the first embodiment, belong to a plurality of request groups. By introducing a request group corresponding to the character string pattern S, the request groups are now segregated into "Not corresponding to S and G01" (¬S∧G01), "Not corresponding to S and G02" (¬S∧G02), "Not corresponding to S and G03" (¬S∧G03), and "Corresponding to S" (S).

However, introducing S may result in an empty request group, that is, a request group without any request belonging to it. Such empty request groups are eliminated, resulting in a possibility of decrease in the number of request groups as a result of introduction of a new request group.

Let us suppose that Request 1 is selected from Request Group G01, and Request 3 is selected from Request Group G02. Request 1 bears the name "top/aaa.jsp?id=1&type=update", and Request 3 bears the name "top/bbb.jsp?id-2&type=update". The common part (character string pattern) in the two names thus is "top/*.jsp?id=*&type=update", where * is a wildcard character representing any character(s).

If the character string patterns are substituted for the four HTTP request groups, they would be ""¬top/*.jsp?id=*&type=update ∧top/aaa.jsp?*" for Request Group G01, ""¬top/*.jsp?id=*&type=update ∧top/bbb.jsp?*" for Request Group G02, ""¬top/*.jsp?id=*&type=update ∧top/ddd.jsp?*" for Request Group R03, and "top/*.jsp?id=*&type=update" for Request Group G04.

In the request history, the requests having the character strings aaa.jsp and bbb.jsp in their names have both parameter "id" and parameter "type", the value of "type" in aaa.jsp being "update", and the value of "type" in bbb.jsp being either "update" or "create". In the request having the character string ddd.jsp in its name, there is neither parameter "id" nor parameter "type". Therefore, the character string pattern representing the four requests groups can be further simplified as "no character string" (because there is no request corresponding to the character string), "top/bbb.jsp?id=*&type=create" for Request Group G02, "top/ddd.jsp?" for Request Group G03, and "top/*.jsp?id=*&type=update" for Request Group G04. Thus, the character string pattern is not a result of just a negative logical product but is determined by taking into consideration the request name of which the character string is a part. As a result, the user can easily understand any analysis done based on the request grouping.

The request grouping apparatus 10 groups the HTTP requests into the designated request groups, namely, Request Group G01—No requests, Request Group G02—Request 7, Request Group G03—Request 9 and Request 17, and Request Group G04—Request 1, Request 3, Request 5, Request 10, Request 12, and Request 14.

Calculating Correlation Value After Modification of Request Grouping

The request classification apparatus 10 according to the first embodiment calculates, based on the inter-request group call relation pattern, the rating value for every modified request group. FIG. 12 is a drawing of a table showing a result of determination of the parent-child pattern for all the request groups along with the frequency of appearance (expected value) of the request groups after modification of request grouping. The rating value calculated by the request classification apparatus 10 using the qui-square method based on the table shown in FIG. 12 comes to 1.26, which is a significant improvement over the rating value of 0.382 obtained prior to modification.

The request classification apparatus 10 similarly performs modification of request grouping and rating for Request 1 and Request 12 and other such pairs of requests that have the same parent-child pattern but belong to different request groups, and in the end selects the request grouping modification that yields the highest rating value.

In the present example, as creating a new request group and including therein Request 1 and Request 3 yields the highest rating value and an improved rating value as compared to the request grouping prior to modification, this request grouping is accepted as the current request grouping.

Determining Ending Condition

The request classification apparatus 10 according to the first embodiment repeats request grouping modification until the predetermined ending condition is met. The ending conditions assigned in the first embodiment are "no improvement is seen in the rating value in spite of modifications" and "End after second modification". As at the present stage in the first embodiment, an improved rating value is obtained and modification of the request grouping has been done only once, the ending condition is not satisfied. Therefore, the request classification apparatus 10 proceeds to perform a second round of request grouping modification.

Second Round of Request Grouping Modification

In the second round of request grouping modification, the request classification apparatus 10 according to the first embodiment selects two requests having the same parent-child pattern but belonging to two different request groups, one from each request group, creates a request group corresponding to the common character string pattern derived from the names of the two requests, and calculates the rating value based on the modified request grouping. After repeating the above steps for all the pairs of requests that have the same pattern but belong to different groups, the request classification apparatus 10 selects the request grouping modification that yields the highest rating value.

For the second round of modification, the request classification apparatus 10 selects Request 2 belonging to Request Group G11 and Request 6 belonging to Request Group G12, both requests being IIOP requests. Request 2 bears the name sss/reqa and Request 6 bears the name sss/reqb, and the character string pattern common to the names of the selected requests is sss/req*. Thus, the new IIOP request group and the set of requests belonging to each of the request groups would be as follows. G11—""¬sss/req* ∧sss/reqa" (no requests), G12—"""¬sss/req* ∧sss/reqb" (no requests), G13—"""¬sss/req* ∧ttt/reqc" (Request 8 and Request 18), and G14—" „sss/req*" (Request 2, Request 4, Request 6, Request 11, Request 13, and Request 16).

FIG. 13 is a drawing of a table showing a result of determination of the parent-child pattern for all the request groups along with the frequency of appearance (expected value) of the request groups after modification of request grouping. FIG. 14 and FIG. 15 are drawings of tables showing the result of correlation value calculation performed request group-wise after modification of request grouping. The rating value calculated by the request classification apparatus 10 using the qui-square method based on the tables shown in FIG. 14 and FIG. 15 comes to 1.73, which is a significant improvement over the rating value of 1.26 obtained after the first round of modification.

Determining Ending Condition

The request classification apparatus 10 according to the first embodiment again checks whether the ending condition is met. As a second round of modification has been carried out, the request classification apparatus 10 determines that the ending condition is met, and outputs the modified request grouping containing therein accepted request groups and the request ID of the requests belonging to each request group.

If we compare FIG. 14 and FIG. 15, which are tables showing the correlation values between the request groups and the parent-child patterns after modification, with FIG. 10 and FIG. 11, which are tables showing the correlation values between the request groups and the parent-child patterns before modification, prior to modification, there are several instances of one request group having a plurality of parent-child pattern with high frequency of appearance, and conversely, several instances of a high frequency of appearance of a plurality of request groups being processed by the same parent-child pattern; From the perspective of system behavior, this translates to inadequate request grouping, or, over-grouping. Wherein, in the request groups obtained after modification shown in FIG. 14 and FIG. 15, there is only one instance of high probability per request group or parent-child pattern (indicated by an underline). This indicates that the request classification apparatus 10 according to the first embodiment is able to group a large number of request names normally used in the system into appropriate request groups so that the system behavior, in other words, call relation between requests, can be better demonstrated.

According to the first embodiment, a request grouping program causes a computer to implement a request grouping method whereby requests that are sent and received in a coordinated manner among a plurality of servers to process a request from a client are segregated into groups. Request grouping is implemented by maintaining request grouping in which a request group is assigned for a predetermined character string in a request name, creating call relation sets from requests sent and received among the servers and stored in the request history, each call relation set being associated to one another by call relation, converting the call relation sets into inter-request group call relation sets base don the request grouping, deriving inter-request group call relation patterns for each request group, each inter-request group call relation pattern consisting of the request group(s) invoking and the request group(s) invoked by the request group in question, along with a frequency of appearance of the request group in the request history, and rating the request group based on the derived inter-request group call relation pattern. Consequently, as compared to the method whereby transactions are grouped by grouping requests by directly using the request names, by assigning a request group for a predetermined character string data in the request name, rating the assigned request group, and improving the request grouping so that a high rating value is obtained, an appropriate request grouping is derived that yields a satisfactory transaction grouping.

According to the first embodiment, the predetermined character string data in the request name in the maintained request grouping is modified, and a new request is assigned to the modified character string data. The inter-request group call relation patterns are derived for every modified request group, the rating value is calculated for each of the inter-request group call relation patterns, and the ending condition is determined by comparing the rating value and a predetermined ending condition. Thus, as the request grouping is automatically modified, an appropriate request grouping is derived that yields a satisfactory transaction grouping.

According to the first embodiment, a correlation value, whereby the strength of correlation between the derived inter-request group call relation pattern and the request group is rated, is calculated based on the frequency of appearance. Consequently, an appropriate request grouping is derived that yields a satisfactory transaction grouping.

According to the first embodiment, call relation sets are created, each call relation set including therein requests associated by exhaustively-projected call relation based on a preset specification, and thereafter the inter-request group call relation patterns are derived. Consequently, even if the call relation between the requests being sent and received among the servers are not monitored in each server, an appropriate request grouping is derived that yields a satisfactory transaction grouping.

The first embodiment is explained by taking the instance where the request classification apparatus assigns a new request group so that identical inter-request group call relation patterns belonging to different groups can be put together in the new request group. However, the present invention can be similarly applied in a situation where the request classification apparatus assigns a new request group so that different inter-request group call relation patterns grouped together in a single request group are grouped in separate request groups.

As a second embodiment of the present invention, the method employed by the request classification apparatus is explained below, whereby a new request group is assigned so that different inter-request group call relation patterns that are grouped together in one request group are grouped in different request groups. All the processes in the second embodiment are similar to those in the first embodiment except for the request grouping modification process. Hence, only the request grouping modification process is explained here.

The request classification apparatus according to the second embodiment first selects a pair of requests that belong to the same request group but possibly could be processed by different parent-child patterns (inter-request group call relation patterns). For example, as shown in FIG. 9, of the transactions (call relation sets) that include the six requests belonging to Request Group G02, Transaction 2 is processed by the parent-child pattern Pattern P022, and Transaction 4 is processed by the parent-child pattern Pattern P024. It can be seen from FIG. 6 that the request belonging to Request Group G02 that corresponds to Transaction 2 is Request 3, and the request belonging to Request Group G02 that corresponds to Transaction 4 is Request 7. Thus, the pair of requests, Request 3 and Request 7 is selected by the request classification apparatus as they are requests that are possibly processed by different parent-child pattern (inter-request group call relation pattern) but belong to the same request group.

The request classification apparatus then compares the request names of the two selected requests, and assigns new request groups so that only one of the two requests belongs in each request group. The request classification apparatus then determines the common part of the two request names and the portions that are not common between the request names. For example, Request 3 bears the name "top/bbb.jsp?id=2&type=update", and Request 7 bears the name "top/bbb.jsp?id=3&type=create". Of these two names, the request classification apparatus extracts "top/bbb.jsp?od=*&type=*" as the common part. As the request classification apparatus uses the character string patterns containing the character string unique to each request name, the request classification apparatus assigns new request groups each of which includes only one of the pair of requests. In the present example, the characters present only in the request name of Request 3 are "2" and "update", which are the values of the parameter "id" and the parameter "type", respectively. Similarly, the characters present only in the request name of Request 7 are "3" and "create", which are the values of the parameter "id" and the parameter "type", respectively. The request classification apparatus therefore adds four new request groups corresponding to the following four character string patterns obtained by adding at a time only one of the four character strings "2", "update", "3", and "create" to the common part of the request names, the character string patterns being, "top/bbb.jsp?id=2&type=*", "top/bbb.jsp?id=*&type=update", "top/bbb.jsp?id=3&type=*", and "top/bbb.jsp?id=*&type=create".

The request classification apparatus according to the second embodiment repeats the above process for all the pairs of requests that belong to the same request group but are possibly processed by different parent-child patterns (inter-request group call relation patterns), determines the ending condition by comparing the calculated rating value with a predetermined ending condition, and ends the request grouping process when the ending condition is met. When selecting the request grouping that yields the highest rating value, the request groups newly assigned by the method described in the first embodiment can also be included.

In the first embodiment, the request classification apparatus creates call relation sets during the inter-request group call relation patterns derivation process by exhaustively projecting, based on a preset specification, call relation for all the requests stored in the request history. However, the present invention can also be applied in the case where the request classification apparatus creates only call relation sets having a high frequency of appearance in the request history using the request grouping maintained during the inert-request group call relation pattern derivation process.

As a third embodiment of the present invention, creation of only call relation sets having a high frequency of appearance in the request history using the request grouping is explained below. All the processes in the third embodiment are similar to those in the first embodiment except for the call relation set creation process. Hence, only the call relation set creation process is explained here.

The request classification apparatus according to the third embodiment creates only the call relation sets having a high frequency of appearance in the request history because it involves a great amount of computing time for creating the transaction candidates (call relation sets) by exhaustively projecting call relation for all the requests when there is a possibility of a plurality of requests being invoked from a plurality of requests and, therefore, a possibility of multiplicity of inter-request group call relation pattern.

For example, when N number of an IIOP request can potentially be called by a designated HTTP request, and another HTTP request, the number of transaction candidates for the designated HTTP request alone can be $2^N$. For example, if N is ten, the approximate number of transaction candidates would be 1,000; and if N is 20, the approximate number of transaction candidates would be 1,000,000. It is not practical for the request classification apparatus to process such large numbers of transaction candidates every time request grouping is to be carried out.

There are two methods for resolving this problem. One method is to determine the upper limit of the number of transaction candidates created for every request being invoked from outside the system and use only a predetermined number of transaction candidates having a high probability of frequency of appearance. The other method for solving the problem is to perform transaction classification (see Japanese Patent Laid-Open Publication No. 2006-11683) and use only the transaction candidates obtained as a result of transaction classification.

By using transaction discrimination, the request classification apparatus selects, for every request invoked from outside the system, those transactions having the greatest possibility from among a large number of transactions. Thus, the request classification apparatus can limit the number of transaction candidates created to the number of requests stored in the request history and carry out request grouping accurately. As the result of transaction discrimination depends on the request grouping, it is necessary to carry out request grouping every time rating is to be calculated.

For example, using the request history according to the first embodiment, the request classification apparatus according to the third embodiment creates the transaction candidates as shown in FIG. 17 by replacing the request name in the request grouping with the corresponding request group ID and performing transaction classification (see Japanese Patent Laid-Open Publication No. 2006-11683).

The request grouping proposed by the present invention is originally meant to be performed as a preprocessing prior to analysis such as transaction classification and contradicts the method according to the third embodiment where transaction classification is used for preprocessing. However, the request classification apparatus according to the third embodiment performs transaction classification based on appropriate request grouping, and modifies the request grouping based on the transaction classification, and once again performs transaction classification, repeating the cycle, and is consequently able to improve the accuracy of both request grouping and transaction classification.

The request classification apparatus according to the first embodiment, second embodiment, and third embodiment have been described so far. It is possible to make various modifications on the request classification apparatus. The various modifications of the request classification apparatus are presented as a fourth embodiment of the present invention.

In the first embodiment, the request classification apparatus creates call relation sets, based on a preset specification, by exhaustively projecting call relation for all the requests in the request history piled up in the log of each server. However, the request classification apparatus can use a monitoring result of each server as the call relation projection result, if each server is a system that monitors the call relation. In this case, the probability of all the transaction candidates will be "1" as the call relations are definite.

In the fist embodiment, the preset specification based on which call relation is exhaustively projected for all the requests in the request history piled up in each server is the magnitude correlation of the request start time and the request end time. The specification that the difference between the start time of the child request and the start time of the parent request is made the lower limit of the minimum time required for starting the child request process, or any other similar specification, can be the made the preset specification based on which call relation projection is carried out.

In the first embodiment, the correlation value, whereby the strength of correlation between the inter-request group call relation pattern and the request group is rated, is used as the rating value for rating the request group. However, the rating value whereby the request group is rated by request group-wise process time distribution or by both inter-request group call relation pattern-wise and request group-wise process time distribution can be used.

In the first embodiment, the qui-square method is used for calculating the correlation value whereby the strength of correlation between the inter-request group call relation pattern and the request group is rated. However, other methods based on the criteria of data volume can be used for calculating the correlation value.

In the first embodiment, the selection criterion for the request group for the requests that belong to a plurality of request groups after a new request group is assigned is the latest request group should be the latest. However, other selection criteria such as the request group having the least number of requests, or the request group having a long character string pattern (in other words, the request group having a more strict condition), etc.

In the first embodiment, request grouping modification is carried out for all the requests, irrespective of whether they are HTTP requests or IIOP requests. However, request grouping modification can be carried out first only for the HTTP requests, leaving the request grouping of the IIOP requests unchanged, and after the HTTP request grouping is modified, request grouping modification can be carried out for the IIOP requests, this time around leaving the request grouping of the HTTP requests unchanged. Alternatively, after request grouping modification of the HTTP requests, request grouping modification can be carried out for the IIOP requests, and based on the result of modification of the IIOP request grouping, the request grouping of the HTTP requests can be modified again. These methods are effective when the nature of the request name varies according to the protocol. For example, these methods are effective when there are very few types of IIOP requests, their names indicating the process content, and hence the request groups are relatively more reliable, and there are a large number of HTTP requests present, if the parameter values present in the HTTP request names are also included.

Figure 18:
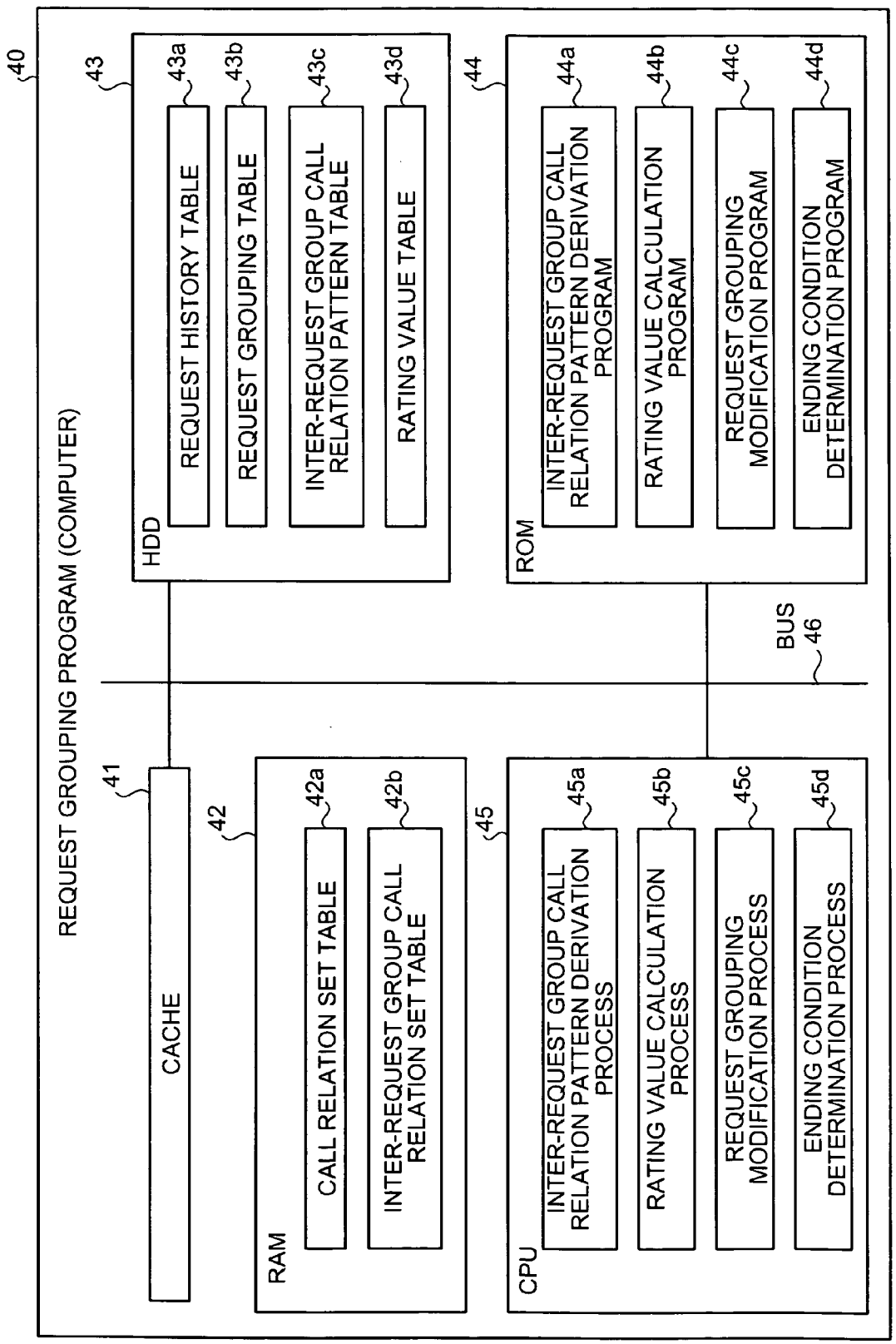
FIG. 18 is a block diagram of a computer that executes a request grouping program according to the first embodiment.

The processes described in the first embodiment can be realized by a computer such as a personal computer or a workstation by executing an installed program. FIG. 18 is a functional block diagram of a computer that executes a request grouping program that demonstrates the functions similar to the request grouping apparatus according to the first embodiment.

As shown in FIG. 18, a request grouping program (computer) 40 includes a cache 41, a Random Access Memory (RAM) 42, a Hard Disk Drive (HDD) 43, a Read-Only Memory (ROM) 44, and a Central Processing Unit (CPU) 45, all of which are connected by a bus 46. The ROM 44 stores therein the request grouping program that demonstrate the functions similar to the request grouping apparatus according to the first embodiment, namely, an inter-request group inter-request group call relation pattern derivation program 44a, a rating value calculation program 44b, a request grouping modification program 44c, and an ending condition determination program 44d.

The CPU 45 loads the inter-request group call relation pattern derivation program 44a, the rating value calculation program 44b, the request grouping modification program 44c, and the ending condition determination program 44d and converts them to a call relation pattern derivation process 45a, a rating value calculation process 45b, a request grouping modification process 45c, and an ending condition determination process 45d, respectively. The call relation pattern derivation process 45a, the rating value calculation process 45b, the request grouping modification process 45c, and the ending condition determination process 45d correspond, respectively, to the inter-request group call relation pattern deriving unit 31, the rating value calculating unit 32, the request grouping modifying unit 33, and the ending condition determining unit 34 of FIG. 2.

The HDD 43 stores therein a request history table 43a, a request grouping table 43b, an inter-request group call relation pattern table 43c, and a rating value table 43d. The request history table 43a, the request grouping table 43b, the inter-request group call relation pattern table 43c, and the rating value table 43d correspond, respectively, to the request history storage unit 21, the request grouping maintaining unit 22, the inter-request group call relation pattern storage unit 25, and the rating value storage unit 26 of FIG. 2. Moreover, the CPU 45 creates a call relation set table 42a from the request history table 43a and stores the call relation set table 42a in the RAM 42, creates an inter-request group call relation set table 42b from the call relation set table 42a and stores the inter-request group call relation set table 42b in the RAM 42, creates the request history table 43a from the call relation set table 42a and the inter-request group call relation set table 42b and stores the request history table 43a into the HDD 43.

The inter-request group call relation pattern derivation program 44a, the rating value calculation program 44b, the request grouping modification program 44c, and the ending condition determination program 44d can be also be stored on a portable physical medium that can be inserted into the computer 40, or on a fixed physical medium such as a hard disk provided in the computer 40, or on another computer (or server) connected to the computer 40 via a public circuit, Internet, Local Area Network (LAN), Wide Area Network (WAN), etc., and read from these medium and executed by the computer 40. Examples of portable physical medium are Flexible Disk (FD), a Compact Disk-Read-Only Memory (CD-ROM), Magneto-Optical (MO) disk, Digital Versatile Disk (DVD), and Integrated Circuit (IC) card, etc.

All the automatic processes explained in the embodiments described above can be, entirely or in part, carried out manually. Similarly, all the manual processes explained in the embodiments described above can be entirely or in part carried out automatically by a known method. The process procedures, the control procedures, specific names, and data, including various parameters, can be changed as required unless otherwise specified.

The constituent elements of the apparatus illustrated are merely conceptual and may not necessarily physically resemble the structures shown in the drawings. For instance, the apparatus need not necessarily have the structure that is illustrated. The apparatus as a-whole or in parts can be broken down or integrated either functionally or physically in accordance with the load or how the device is to be used. The process functions performed by the apparatus are entirely or partially realized by the CPU or a program executed by the CPU or by a hardware using wired logic.

According to an embodiment of the present invention, as compared to the method, whereby transactions are grouped by grouping requests by directly using the request names, by assigning a request group for a predetermined character string data in the request name, rating the assigned request group, and improving the request grouping so that a high rating value is obtained, an appropriate request grouping is derived that yields a satisfactory transaction grouping.

According to the embodiment, as the request grouping is automatically modified, an appropriate request grouping is derived that yields a satisfactory transaction grouping.

According to the embodiment, an appropriate request grouping is derived that yields a satisfactory transaction grouping.

According to the embodiment, even if the call relation between the requests being sent and received among the servers are not monitored in each server, an appropriate request grouping is derived that yields a satisfactory transaction grouping.

According to the embodiment, even if there is a multiplicity of call relations between the requests arising from a plurality of requests invoking a plurality of other requests, an appropriate request grouping is derived that yields a satisfactory transaction grouping.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A physical medium that stores therein a computer program that causes a computer to implement a request grouping method for grouping system requests in a system that processes a request from a client by sending and receiving the system requests among a plurality of servers in the system in a coordinated manner, the computer program causing the computer to execute:

maintaining request grouping rules for grouping a system request into a request group assigned for a common character string with respect to a name of the system request;

creating call relation sets from the system requests sent and received among the servers and stored in the request history by projecting an invoking request and an invoked request of each system request;

converting the call relation sets into inter-request group call relation sets by replacing all requests in each of the call relation sets with corresponding request groups according to the request grouping rules;

deriving an inter-request group call relation pattern for the request group and a frequency of appearance of the inter-request group call relation pattern based on the inter-request group call relation sets, the inter-request group call relation pattern including a request group corresponding to the invoking request and a request group corresponding to the invoked request;

calculating a rating value for rating the request groups based on the inter-request group call relation pattern derived;

modifying the character string in the system request in the request grouping rules and assigning a new request group to a modified character string, updating the inter-request group call relation pattern based on new request grouping rules including the new request group; and determining an ending condition by comparing a rating value calculated for the updated inter-request group call relation pattern and a predetermined ending condition; and the modifying includes assigning, when different inter-request group call relation patterns derived are associated with the same request group in the request grouping rules, the new request group so that the inter-request group call relation patterns are segregated in different request groups.

2. The physical medium according to claim 1, wherein the calculating includes calculating a correlation value, whereby a strength of correlation between derived inter-request group call relation pattern and the request group is rated, on the frequency of appearance.

3. The physical medium according to claim 1, wherein the creating includes projecting the call relation based on a call source address, a call destination address, a start time, and an end time of the system requests.

4. The physical medium according to claim 1, wherein the deriving includes deriving the inter-request group call relation pattern for a request group corresponding to a call relation set having a high frequency of appearance in the request history.

5. The physical medium according to claim 1, wherein the modifying includes assigning, when same inter-request group call relation pattern derived is associated with different request groups in the request grouping rules, the new request group so that identical inter-request group call relation patterns are grouped together in one request group.

6. A request grouping apparatus that groups system requests in a system that processes a request from a client by sending and receiving the system requests among a plurality of servers in the system in a coordinated manner, the request grouping apparatus comprising:

a maintaining unit that maintains request grouping rules for grouping a system request into a request group assigned for a common character string with respect to a name of the system request;

a pattern deriving unit that creates call relation sets from the system requests sent and received among the servers and stored in the request history by projecting an invoking request and an invoked request of each system request, converts the call relation sets into inter-request group call relation sets by replacing all requests in each of the call relation sets with corresponding request groups according to the request grouping rules, and derives an inter-request group call relation pattern for the request group and a frequency of appearance of the inter-request group call relation pattern based on the inter-request group call relation sets, the inter-request group call relation pattern including a request group corresponding to the invoking request and a request group corresponding to the invoked request;

a calculating unit that calculates a rating value whereby the request groups are rated based on the inter-request group call relation pattern derived by the deriving unit; and a modifying unit that modifies the character string in the system request in the request grouping rules and assigns a new request group to modified character string, wherein the deriving unit updates the inter-request group call relation pattern based on new request grouping rules including the new request group assigned by the modifying unit, and the calculating unit calculates the rating value for the updated inter-request group call relation pattern, and determines an ending condition by comparing the rating value and a predetermined ending condition, wherein when same inter-request group call relation pattern derived is associated with different request groups in the request grouping rules, the modifying unit assigns the new request group so that identical inter-request group call relation patterns are grouped together in one request group.

7. The request grouping apparatus according to claim 6, wherein the calculating unit calculates a correlation value, whereby a strength of correlation between derived inter-request group call relation pattern and the request group is rated, on the frequency of appearance.

8. The request grouping apparatus according to claim 6, wherein the deriving unit projects the call relation based on a call source address, a call destination address, a start time, and an end time of the system requests.

9. The request grouping apparatus according to claim 6, wherein the deriving unit derives the inter-request group call relation for a request group corresponding to a call relation set having a high frequency of appearance in the request history.

10. A request grouping method for grouping system requests in a system that processes a request from a client by sending and receiving the system requests among a plurality of servers in the system in a coordinated manner, the request grouping method comprising:

maintaining request grouping rules for grouping a system request into a request group assigned for a common character string with respect to a name of the system request;

creating call relation sets from the system requests sent and received among the servers and stored in the request history by projecting an invoking request and an invoked request of each system request;

converting the call relation sets into inter-request group call relation sets by replacing all requests in each of the call relation sets with corresponding request groups according to the request grouping rules;

deriving an inter-request group call relation pattern for the request group and a frequency of appearance of the inter-request group call relation pattern based on the inter-request group call relation sets, the inter-request group call relation pattern including a request group corresponding to the invoking request and a request group corresponding to the invoked request;

calculating a rating value for rating the request groups based on the inter-request group call relation pattern derived;

modifying the character string in the system request in the request grouping rules and assigning a new request group to modified character string;

updating the inter-request group call relation pattern based on new request grouping rules including the new request group; and determining an ending condition by comparing a rating value calculated for the updated inter-request group call relation pattern and a predetermined ending condition, wherein the modifying includes assigning, when same inter-request group call relation pattern derived is associated with different request groups in the request grouping rules, the new request group so that identical inter-request group call relation patterns are grouped together in one request group.

11. The request grouping method according to claim 10, wherein the calculating includes calculating a correlation value, whereby a strength of correlation between derived inter-request group call relation pattern and the request group is rated, on the frequency of appearance.

12. The request grouping method according to claim 10, wherein the creating includes projecting the call relation based on a call source address, a call destination address, a start time, and an end time of the system requests.

13. The request grouping method according to claim 10, wherein the deriving includes deriving the inter-request group call relation pattern for a request group corresponding to a call relation set having a high frequency of appearance in the request history.

\* \* \* \* \*